United States Patent
Tanigawa et al.

(10) Patent No.: US 12,130,267 B2
(45) Date of Patent: Oct. 29, 2024

(54) ANALYZING METHOD FOR AZO COMPOUND

(71) Applicant: SHIMADZU CORPORATION, Kyoto (JP)

(72) Inventors: Tetsuo Tanigawa, Kyoto (JP); Natsuyo Asano, Kyoto (JP); Zhao Qi Zhan, Singapore (SG); Yin Ling Chew, Singapore (SG); Jun Xiang Lee, Singapore (SG); Jie Xing, Singapore (SG)

(73) Assignee: SHIMADZU CORPORATION, Kyoto (JP)

( * ) Notice: Subject to any disclaimer, the term of this patent is extended or adjusted under 35 U.S.C. 154(b) by 518 days.

(21) Appl. No.: 17/296,642

(22) PCT Filed: Oct. 30, 2019

(86) PCT No.: PCT/JP2019/042673
§ 371 (c)(1),
(2) Date: May 25, 2021

(87) PCT Pub. No.: WO2020/110584
PCT Pub. Date: Jun. 4, 2020

(65) Prior Publication Data
US 2022/0026404 A1      Jan. 27, 2022

(30) Foreign Application Priority Data
Nov. 28, 2018   (SG) .......................... 10201810673S

(51) Int. Cl.
*G01N 30/34*  (2006.01)
*B01D 15/32*  (2006.01)
(Continued)

(52) U.S. Cl.
CPC .......... *G01N 30/34* (2013.01); *B01D 15/325* (2013.01); *G01N 30/7233* (2013.01);
(Continued)

(58) Field of Classification Search
CPC .... G01N 30/04; G01N 30/7233; G01N 30/88; G01N 2030/027; G01N 2030/6013; G01N 2030/884; B01D 15/325
See application file for complete search history.

(56) References Cited

U.S. PATENT DOCUMENTS 6,802,967 B2 * 10/2004 Masuda ............... G01N 30/463
                                                                210/659
7,214,313 B2 *  5/2007 Hayashi ............... G01N 30/463
                                                                210/656
(Continued)

FOREIGN PATENT DOCUMENTS

CN    102788852 A  * 11/2012
CN    104330510 A  *  2/2015
(Continued)

OTHER PUBLICATIONS

Yinon et al. "Chapter 4: LC-MS Techniques for the Analysis of Dyes" Journal of Chromatography Library, vol. 59, 1996, pp. 187-218 <https://www.sciencedirect.com/science/article/abs/pii/S0301477008607812> (Year: 1996).*
(Continued)

*Primary Examiner* — Jonathan M Dunlap
(74) *Attorney, Agent, or Firm* — Sughrue Mion, PLLC

(57) ABSTRACT

A large number of kinds of azo compounds which are representative hazardous substances in fiber products are divided into two groups. The compounds included in the first group are detected by an MRM measurement by a tandem mass spectrometer unit (12) in a measurement section (10) while a two-liquid gradient elution under an acidic condition
(Continued)

is performed in a liquid chromatograph unit (11), using an aqueous ammonium acetate solution as mobile phase A, and a mixture of acetonitrile and an aqueous ammonium acetate solution as mobile phase B. On the other hand, the compounds included in the second group are detected by an MRM measurement while a two-liquid gradient elution under a neutral or weakly basic condition is performed using an aqueous ammonium bicarbonate solution as mobile phase A and acetonitrile as mobile phase B. An exhaustive quantitative analysis for major azo compounds can be achieved by performing the two analyses for the same sample. An efficient test with a shortened analysis period can thereby be performed.

5 Claims, 17 Drawing Sheets

(51) Int. Cl.
    *G01N 30/02*       (2006.01)
    *G01N 30/60*       (2006.01)
    *G01N 30/72*       (2006.01)
    *G01N 30/88*       (2006.01)

(52) U.S. Cl.
    CPC ....... *G01N 30/88* (2013.01); *G01N 2030/027* (2013.01); *G01N 2030/6013* (2013.01); *G01N 2030/884* (2013.01)

(56) References Cited

U.S. PATENT DOCUMENTS

| | | | | |
|---|---|---|---|---|
| 8,642,351 | B2* | 2/2014 | Liu | G01N 30/34 422/89 |
| 8,703,754 | B2* | 4/2014 | Gibbon | A61P 35/00 514/183 |
| 9,638,677 | B2* | 5/2017 | Kobayashi | H01J 49/0031 |
| 9,679,757 | B2* | 6/2017 | Netto | G01N 30/463 |
| 2003/0168392 | A1* | 9/2003 | Masuda | G01N 30/463 422/70 |
| 2005/0218055 | A1* | 10/2005 | Hayashi | G01N 30/463 210/198.2 |
| 2009/0035807 | A1* | 2/2009 | McCellan | C07K 1/16 435/29 |
| 2010/0107742 | A1* | 5/2010 | Liu | G01N 30/34 73/61.56 |
| 2012/0308609 | A1* | 12/2012 | Gibbon | A61P 11/00 514/263.22 |
| 2014/0306105 | A1* | 10/2014 | Netto | H01J 49/26 250/288 |
| 2016/0209378 | A1* | 7/2016 | Kobayashi | H01J 49/4225 |

FOREIGN PATENT DOCUMENTS

| | | | | |
|---|---|---|---|---|
| WO | WO-2012035412 | A2 * | 3/2012 | ......... G01N 30/7233 |
| WO | WO-2013024518 | A1 * | 2/2013 | ............ G01N 30/02 |

OTHER PUBLICATIONS

Holcapek et al. "Analysis of sulphonated dyes and intermediates by electrospray mass spectrometry" Dyes and Pigments, vol. 43, Issue 2, Aug. 1999, pp. 127-137 <https://www.sciencedirect.com/science/article/pii/S0143720899000510> (Year: 1999).*
Pinheiro et al. "Aromatic amines from azo dye reduction: status review with emphasis on direct UV spectrophotometric detection in textile industry wastewaters" Dyes and Pigments, vol. 61, Issue 2, May 2004, pp. 121-139 <https://www.sciencedirect.com/ science/article/pii/S0143720803002092> (Year: 2004).*
Souto, Catia. "Analysis of Early Synthetic Dyes with HPLC-DAD-MS An important database for analysis of colorants used in cultural heritage" Thesis <https://run.unl.pt/bitstream/10362/5656/1/Souto_2010.pdf> (Year: 2010).*
Piccinini, P. "Progress report on the development of standard methods for the characterisation of textile fibres and yarns and for the safety of textile products and toys" JRC Scientific and Policy Reports, Report EUR 26466 EN, 2013 <https://publications.jrc.ec.europa.eu/repository/handle/JRC87478> (Year: 2013).*
Young et al. "LC-MS Determination of Sudan Dyes in Chili Oleoresin Using the CORTECS C18, 2.7 um Column" Waters Application Note, Jun. 2014. <https://www.waters.com/webassets/cms/library/docs/720005070en.pdf> (Year: 2014).*
Gay et al. "Rapid Screening of 36 Synthetic Dyes using the ACQUITY UPLC H-Class System with the ACQUITY QDa Detector" Wasters Technology Brief, Oct. 2014. <https://www.waters.com/webassets/cms/library/docs/720005194en.pdf> (Year: 2014).*
Levi Strauss & Co. "Restricted Substances List" Jul. 2014 <http://levistrauss.com/wp-content/uploads/2014/09/July-2014-RSL-English.pdf> (Year: 2014).*
Agilent, "Hydrophilic Interaction Chromatography Method Development and Troubleshooting", May 1, 2018,<https://www.agilent.com/cs/library/technicaloverviews/public/5991-9271EN_HILIC_method_development_TechOverview.pdf> (Year: 2018).*
"What is Standard 100 by Oeko-Tex?" Standard 100 by OEKO-TEX, 2018, 4 pgs., <URL: https://www.oeko-tex.com/en/consumer/what_is_standard100/what_is_standard100.xhtml>.
Gerd Vanhoenacker et al., "Developing a method for the analysis of Azo Dyes using the Agilent 1290 Infinity LC Method Development System and the Agilent Method Scouting Wizard software", Agilent Technologies, Feb. 1, 2011, 8 pgs.
Rebecca Stevens et al., "Excellent Resolution of EU-Regulated Azo Dye Aryl Amines by GC-MS on the Rxi-35Sil MS GC Column", RESTEK, accessed on Oct. 18, 2018, 2 pgs.
"Consumer products testing application notebook", Waters Corporation, 2016, pp. 25-41.
Zhao, X. H. et al., "Study of biodegradation products from azo dyes in fungal degradation by capillary electrophoresis/electrospray mass spectrometry", Journal of Chromatography A, 2007, pp. 217-224, vol. 1159.
Additives for LC-MS Part 4: "Reverse buffering, negative & reverse ionization", Analytix How to Use Salts Effectively in LC-MS Analysis, Sigma Aldrich Japan Co., Ltd., 2007 Issue 5.
"Test methods for certain aromatic amines derived from azo colorants", Shimadzu Application Data Sheet, Shimadzu Corporation, No. 121, 2016, 2 pgs.
Written Opinion of the International Searching Authority for PCT/JP2019/042673 dated, Feb. 4, 2020 (PCT/ISA/237).
International Search Report for PCT/JP2019/042673 dated, Feb. 4, 2020 (PCT/ISA/210).

* cited by examiner

Fig. 5

Aromatic amine compounds

| No | Compound name | Molecular formula | CAS No. | Exact mass |
|---|---|---|---|---|
| 1 | 2,4'-Diaminoanisole | C7H10N2O | 615-05-4 | 138.0793 |
| 2 | 2,6'-Xylidine | C8H11N | 87-62-7 | 121.0891 |
| 3 | 2-Naphthylamine | C10H9N | 91-59-8 | 143.0735 |
| 4 | 3,3'-Dichlorobenzidine | C12H10Cl2N2 | 91-94-1 | 252.0221 |
| 5 | 4,4'-Thiodianiline | C12H12N2S | 139-65-1 | 216.0721 |
| 6 | 4-Aminoazobenzene | C12H11N3 | 60-09-3 | 197.0953 |
| 7 | 4-Aminobiphenyl | C12H11N | 92-67-1 | 169.0891 |
| 8 | 4-Chloro-o-toluidine | C7H8ClN | 95-69-2 | 141.0345 |
| 9 | 4,4'-Methylene-bis-2-chloroaniline | C13H12N2Cl2 | 101-14-4 | 266.0377 |
| 10 | 2,4'-Toluenediamine | C7H10N2 | 95-80-7 | 122.0844 |
| 11 | 2,4'-Xylidine | C8H11N | 95-68-1 | 121.0891 |
| 12 | 4,4'-Methylene-o-toluidine | C15H18N2 | 838-88-0 | 226.1470 |
| 13 | Benzidine | C12H12N2 | 92-87-5 | 184.1000 |
| 14 | 4-Chloroaniline | C6H6ClN | 106-47-8 | 127.0189 |
| 15 | 3,3'-Dimethoxybenzidine | C14H16N2O2 | 119-90-4 | 244.1212 |
| 16 | o-Aminoazotoluene | C14H15N3 | 97-56-3 | 225.1266 |
| 17 | 2,4,5-Trimethylaniline | C9H13N | 137-17-7 | 135.1048 |
| 18 | 4,4'-Oxydianiline | C12H12N2O | 101-80-4 | 200.0949 |
| 19 | 4,4'-Diaminodiphenylmethane | C13H14N2 | 101-77-9 | 198.1157 |
| 20 | o-Anisidine | C7H9O1N | 90-04-0 | 123.0684 |
| 21 | o-Toluidine | C7H9N | 95-53-4 | 107.0735 |
| 22 | p-Cresidine | C8H11O1N | 120-71-8 | 137.0840 |
| 23 | o-Tolisine | C14H16N2 | 119-93-7 | 212.1313 |
| 24 | 5-Nitro-o-toluidine | C7H8N2O2 | 99-55-8 | 152.0586 |

Fig. 6

Dye compounds Group 1 (1/2)

| No | Dye name | Molecular formula | CAS No. | Exact mass |
|---|---|---|---|---|
| 1 | Basic Red 9 | C19H17N3 | 569-61-9 | 287.1422 |
| 2 | Disperse Blue 1 | C14H12N4O2 | 2475-45-8 | 268.096 |
| 3 | Basic Violet 14 | C20H20ClN3 | 632-99-5 | 337.1346 |
| 4 | Disperse Blue 7 | C18H18N2O6 | 3179-90-6 | 358.1165 |
| 5 | Disperse Blue 3 | C17H16N2O3 | 2475-46-9 | 296.1161 |
| 6 | Disperse Red 11 | C15H12N2O3 | 2872-48-2 | 268.0848 |
| 7 | Disperse Blue 102 | C15H19N5O45 | 12222-97-8 | 365.1158 |
| 8 | Disperse Red 17 | C17H20N4O4 | 3179-89-3 | 344.1484 |
| 9 | Disperse Yellow 39 | C17H16N2O | 12236-29-2 | 264.1263 |
| 10 | Disperse Blue 106 | C14H17N5O35 | 12223-01-7 | 335.1052 |
| 11 | Solvent Yellow 1 | C12H11N3 | 60-09-3 | 197.0953 |
| 12 | Disperse Orange 3 | C12H10N4O2 | 730-4-5 | 242.0804 |
| 13 | Disperse Yellow 3 | C15H15N2O2 | 2832-40-8 | 255.1133 |
| 14 | Disperse Brown 1 | C16H15Cl3N4O4 | 23355-64-8 | 432.0158 |
| 15 | Disperse Orange 11 | C15H11NO2 | 82-28-0 | 237.0790 |
| 16 | Bsic Green 4 | C23H25ClN2 | 569-64-2 | 364.1706 |
| 17 | Disperse Red 1 | C16H18N4O3 | 2872-52-8 | 314.1379 |
| 18 | Disperse Blue 35 | C20H14N2O5 | 12222-75-2 | 362.0902 |
| 19 | Disperse Yellow 49 | C22H22N4O2 | 54824-37-2 | 374.1742 |
| 20 | Basic Violet 1 | C24H28ClN3 | 8004-87-3 | 393.1972 |
| 21 | Solvent Yellow 3 | C14H15N3 | 97-56-3 | 225.1266 |
| 22 | Disperse Blue 124 | C16H19N5O45 | 61951-51-7 | 377.1158 |

Fig. 7

Dye compounds Group 1 (2/2)

| No | Dye name | Molecular formula | CAS No. | Exact mass |
|---|---|---|---|---|
| 23 | Basic Violet 3 | C25H30N3Cl | 548-62-9 | 407.2128 |
| 24 | Solvent Yellow 2 | C14H15N3 | 60-11-7 | 225.1266 |
| 25 | Disperse Orange 37/76 | C17H15Cl2N2O5 | 13301-61-6 | 397.0358 |
| 26 | Michler7s Base | C17H22N2 | 30135-64-9 | 254.1783 |
| 27 | Disperse Blue 26 | C16H14N2O4 | 3860-63-7 | 298.0953 |
| 28 | Disperse Orange 61 | C17H15Br2N5O2 | 12270-45-0 | 478.9592 |
| 29 | Disperse Yellow 56 | C21H15N5O2 | 54077-16-6 | 369.1225 |
| 30 | Disperse Orange 1 | C18H14N4O2 | 2581-69-3 | 318.1116 |
| 31 | Disperse Yellow 23 | C18H14N4O | 6250-23-3 | 302.1167 |
| 32 | Basic Blue 26 | C33H32ClN3 | 2580-56-5 | 505.2285 |
| 33 | Sudan Dye I | C16H12ON5 | 842-07-9 | 248.0949 |
| 34 | Disperse Red 151 | C27H25N5O5S | 70210-08-1 | 531.1576 |
| 35 | Sudan Dye II | C18H16N2O | 3118-97-6 | 276.1263 |
| 36 | Sudan Dye III | C22H16N4O | 85-86-9 | 352.1324 |
| 37 | Sudan Dye IV | C24H20N4O | 85-83-6 | 380.1637 |
| 38 | Acid Orange 7 | C16H11N2NaO4S | 633-96-5 | 350.0337 |
| 39 | Acid Yellow 36 | C18H15N3NaO3S | 587-98-4 | 376.0732 |
| 40 | Acid Violet 49 | C39H40N3NaO6S2 | 1694-09-3 | 733.87 |
| 41 | Disperse Yellow 1 | C12H9N3O5 | 119-15-3 | 275.0542 |
| 42 | Disperse Yellow 9 | C12H10N4O4 | 6373-73-5 | 274.0702 |
| 43 | Disperse Yellow 7 | C19H16N4O | 6300-37-4 | 316.1324 |
| 44 | Disperse Orange 149 | C25H26N6O3 | 85136-74-9 | 458.2066 |

Fig. 8

Dye compounds Group2

| No | Dye name | Molecular formula | CAS No. | Exact mass |
|---|---|---|---|---|
| 1 | Acid Red 26 | C18H14N2Na2O7S2 | 3761-53-3 | 480.0038 |
| 2 | Acid Red 114 | C37H28N4Na2O10S3 | 6459-94-5 | 830.0763 |
| 3 | Direct Red 28 | C32H22N6Na2O6S2 | 57358-0 | 696.0838 |
| 4 | Direct Blue 6 | C32H20N6Na4O14S4 | 2602-46-2 | 931.9512 |
| 5 | Direct Black 38 | C34H25N9Na2O7S2 | 1937-37-7 | 781.1114 |
| 6 | Direct Brown 95 | C31H18CuN6O9S.2Na | 16071-86-6 | 759.0047 |
| 7 | Navy Blue 1 (Navy Blue 018112) | C39H23ClCrN7O12S.2Na | 118685-33-9 | 946.0014 |

Fig. 9

Perfluorocompounds (PFCs)

| No | Compound name | Abbreviation | Molecular formula | CAS No. | Exact mass |
|----|---|---|---|---|---|
| 1 | Perfluorobutanoic acid | PFBA | C4HF7O2 | 375-22-4 | 213.99 |
| 2 | Perfluoro-n-pentanoic acid | PFPA | C5HF9O2 | 2706-90-3 | 263.98 |
| 3 | Perfluorohexanoic acid | PFHxA | C6HO2F11 | 307-24-4 | 313.98 |
| 4 | Perfluoro-n-heptanoic acid | PFHpA | C7HF13O2 | 375-85-9 | 363.98 |
| 5 | Perfluoroctane acid | PFOA | C8HF15O2 | 335-67-1 | 413.97 |
| 6 | Perfluoro-n-nonanoic acid | PFNA | C9HF17O2 | 375-95-1 | 463.97 |
| 7 | Perfluoro-n-decanoic acid | PFDA | C10HF17O2 | 335-76-2 | 513.97 |
| 8 | Perfluoro-3,7-dimethyloctanoic acid | PF-3,7-DMOA | C10HF19O2 | 172155-07-6 | 513.97 |
| 9 | Perfluoroundecanoic acid | PFUnA | C11HF21O2 | 2058-94-8 | 563.96 |
| 10 | Perfluoro-n-dodecanoic acid | PFDoA | C12HF23O2 | 307-55-1 | 613.96 |
| 11 | Perfluoro-n-tridecanoic acid | PFTrDA | C13HO2F25 | 72629-94-8 | 663.96 |
| 12 | Perfluoro-n-tetradecanoic acid | PFTeDA | C14HO2F27 | 376-06-7 | 713.95 |
| 13 | Perfluorooctanesulfonic acid | PFOS | C8F17HS | 1763-23-1 | 499.94 |
| 14 | Perfluorobutane sulfonate | PFBS | C4F9SO3H | 375-73-5 | 299.95 |
| 15 | Perfluorohexane solfonate | PFHxS | C6F13HO3S | 355-46-4 | 399.94 |
| 16 | Perfluoroheptanesulfonic acid | PFHpS | C7HF15O3S | 375-92-8 | 449.94 |
| 17 | Sodium perfluoro-1-decanesulfonate | L-PFDS | C10HF21SO3 | 126105-34-8 | 599.93 |
| 18 | N-methyperfluoro-1-octansulfonamide | N-MeFOSA-M | C9H4F17NO2S | 31506-32-8 | 512.97 |
| 19 | N-ethylperfluoro-1-octansulfonamide | N-EtFOSA-M | C10H6F17NO2S | 4151-50-2 | 526.98 |
| 20 | Perfluorooctanesulfonamide | PFOSA | C8H2F17NO2S | 754-91-6 | 498.95 |
| 21 | 7H-Perfluoroheptanoic acid | HPFHpA | CHF2(CF2)5COOH | 1546-95-8 | 345.99 |
| 22 | 2H,2H-Perfluorodecanoic acid | H2PFDA/FOEA | CF3(CF2)7CH2COOH | 27854-31-5 | 477.99 |
| 23 | 2H,2H,3H,3H-Perfluoroundecanoic acid | H4PFUnA | CF3(CF2)7(CH2)2COOH | 34598-33-9 | 492.00 |
| 24 | 1H,1H,2H,2H-Perfluorooctanesulfonic acid | H4PFOS | C8H5F13O3S | 27619-97-2 | 427.98 |

Fig. 10

Alkylphenols (AP)

| No | Compound name | Abbreviation | Molecular formula | Exact mass |
|---|---|---|---|---|
| 1 | Nonylphenol | NP | $C_{15}H_{24}O$ | 220.18 |
| 2 | 4-Nonylphenol | 4-n-NP | $C_{15}H_{24}O$ | 220.18 |
| 3 | 4-n-Octylphenol | 4-n-OP | $C_{14}H_{22}O$ | 206.17 |
| 4 | 4-tert-Octylphenol | 4-t-OP | $C_{14}H_{22}O$ | 206.17 |

Fig. 11

Alkylphenol ethoxylates (APEO)

| No | Compound name | Abbreviation | Molecular formula | Exact mass |
|---|---|---|---|---|
| 1 | Nonylphenol Ethoxylate | NPEO | $C_{15}H_{24}O(C_2H_4O)_n$ (where n=3~17) | Varies |
| 2 | Octylphenol Ethoxylate | OPEO | $C_{14}H_{22}O(C_2H_4O)_n$ (where n=3~16) | Varies |

Fig. 12

Aromatic amine compounds

| No | Compound name | RT(min) | Quantifier MRM transion | Reference MRM transion |
|---|---|---|---|---|
| 1 | 2,4'-Diaminoanisole | 2.502 | 139.1>108 | 139.1>124.1 | 139.1>107.05 |
| 2 | 2,6'-Xylidine | 4.498 | 122.1>77.05 | 122.1>107.1 | 122.1>79.05 |
| 3 | 2-Naphthylamine | 5.543 | 144.1>127.05 | 144.1>78.95 | 144.1>51.05 |
| 4 | 3,3'-Dichlorobenzideine | 6.22 | 253.1>217 | 253.1>182 | 253.1>154 |
| 5 | 4,4'-Thiodianiline | 5.121 | 217.1>124 | 217.1>80 | 217.1>199.1 |
| 6 | 4-Aminoazobenzene | 6.353 | 198.1>77.1 | 198.1>51.1 | 198.1>105.1 |
| 7 | 4-Aminobiphenyl | 5.986 | 170.1>152.1 | 170.1>153.15 | 170.1>127.1 |
| 8 | 4-Chloro-o-toluidine | 5.833 | 142.1>107.15 | 142.1>106.15 | 142.1>89.1 |
| 9 | 4,4'-Methylene-bis-2-chloroaniline | 6.316 | 267.1>231.05 | 267.1>195.1 | 267.1>140 |
| 10 | 2,4-Toluenediamine | 2.627 | 123.1>108 | 123.1>77 | 123.1>106.05 |
| 11 | 2,4-Xylidine | 5.567 | 122.1>77.1 | 122.1>79.05 | 122.1>107.1 |
| 12 | 4,4'-Methylene-o-toluidine | 4.609 | 227.2>120.05 | 227.2>76.95 | 227.2>178.1 |
| 13 | Benzidine | 3.758 | 185.1>167.15 | 185.1>168.2 | 185.1>139 |
| 14 | 4-Chloroaniline | 5.32 | 128.1>93.1 | 128.1>75.2 | 128.1>110.95 |
| 15 | 3,3'-Dimethoxybenzidine | 4.707 | 245.2>230.1 | 245.2>187.1 | 245.2>202.15 |
| 16 | o-Aminoazotoluene | 6.963 | 226.2>51 | 226.2>121.05 | 226.2>106 |
| 17 | 2,4,5-Trimethylaniline | 4.856 | 136.1>121.1 | 136.1>91.1 | 136.1>77 |
| 18 | 4,4'-Oxydianiline | 3.649 | 201.1>108.05 | 201.1>80.1 | 201.1>156.2 |
| 19 | 4,4'-Diaminodiphenylmethane | 3.769 | 199.2>106.05 | 199.2>77.05 | 199.2>79.05 |
| 20 | o-Anisidine | 4.068 | 124.1>109.05 | 124.1>80 | 124.1>65.05 |
| 21 | o-Toluidine | 4.758 | 108.1>91.05 | 108.1>65.1 | 108.1>93.05 |
| 22 | p-Cresidine | 4.85 | 138.1>123.05 | 138.1>122.05 | 138.1>77 |
| 23 | o-Tolidine | 4.758 | 213.1>180.05 | 213.1>198.15 | 213.1>152.15 |
| 24 | 5-Nitro-o-toluidine (NOT) | 5.344 | 153.15>136.15 | 153.1>106.15 | ― |

Fig. 13

Dye compounds Group 1 (1/2)

| No | Dye name | RT(min) | Quantifier MRM transition | Reference MRM transition |
|---|---|---|---|---|
| 1 | Basic Red 9 | 2.144 | 288.10>195.10 | 288.10>151.05 | 288.10>167.05 |
| 2 | Disperse Blue 1 | 2.163 | 269.10>161.05 | 269.10>107.00 | 269.10>135.05 |
| 3 | Basic Violet 14 | 2.714 | 302.20>209.05 | 302.20>195.10 | 302.20>286.15 |
| 4 | Disperse Blue 7 | 2.852 | 359.20>283.10 | 359.20>314.10 | 359.20>328.00 |
| 5 | Disperse Blue 3 | 3.743 | 297.10>252.10 | 297.10>235.05 | 297.10>251.10 |
| 6 | Disperse Red 11 | 3.832 | 269.10>226.05 | 269.10>254.05 | 269.10>169.05 |
| 7 | Disperse Blue 102 | 4.396 | 366.10>208.15 | 366.10>147.10 | 366.10>118.10 |
| 8 | Disperse Red 17 | 5.086 | 345.20>164.10 | 345.20>177.10 | 345.20>269.10 |
| 9 | Disperse Yellow 39 | 5.358 | 265.10>249.10 | 265.10>250.10 | 265.10>120.05 |
| 10 | Disperse Blue 106 | 5.495 | 336.10>178.15 | 336.10>118.05 | 336.10>147.10 |
| 11 | Solvent Yellow 1 | 5.58 | 198.10>77.10 | 198.10>55.10 | 198.10>105.10 |
| 12 | Disperse Orange 3 | 6.038 | 243.10>122.00 | 243.10>75.00 | 243.10>92.15 |
| 13 | Disperse Yellow 3 | 6.099 | 270.10>107.00 | 270.10>108.05 | 270.10>150.05 |
| 14 | Disperse Brown 1 | 6.214 | 433.00>153.05 | 433.00>197.10 | 433.00>357.00 |
| 15 | Disperse Orange 11 | 6.252 | 238.00>165.10 | 238.00>167.10 | 238.00>222.95 |
| 16 | Basic Green 4 | 6.631 | 329.20>313.20 | 329.20>208.15 | 329.20>165.10 |
| 17 | Disperse Red 1 | 6.82 | 315.10>134.10 | 315.10>255.10 | 315.10>122.00 |
| 18 | Disperse Blue 35 | 7.353 | 285.10>270.05 | 285.10> | 41.90 |
| 19 | Disperse Yellow 49 | 7.516 | 375.20>238.15 | 375.20>208.15 | 375.20>210.10 |
| 20 | Disperse Violet 1 | 7.531 | 358.30>342.25 | 358.30>326.10 | 358.30>343.25 |
| 21 | Solvent Yellow 3 | 7.584 | 226.30>91.05 | 226.30>87.10 | 21.05 |
| 22 | Disperse Blue 124 | 7.662 | 378.10>220.15 | 378.10>87.10 | 378.10>160.15 |

Fig. 14

Dye compounds Group 1 (2/2)

| No | Dye name | RT(min) | Quantifier MRM transition | Reference MRM transition |
|---|---|---|---|---|
| 23 | Basic Violet 3 | 8.527 | 372.30>235.15 | 372.30>356.25 372.30>340.20 |
| 24 | Solvent Yellow 2 | 8.961 | 226.20>77.05 | 226.20>120.10 226.20>92.10 |
| 25 | Disperse Orange 37/76 | 9.009 | 392.10>323.00 | 392.10>351.05 392.10>133.05 |
| 26 | Michler7s Base | 9.038 | 255.20>240.10 | 255.20>239.15 255.20>223.15 |
| 27 | Disperse Blue 26 | 9.14 | 299.10>284.05 | 299.10>266.00 299.10>267.00 |
| 28 | Disperse Orange 61 | 9.275 | 482.00>363.00 | 482.00>440.90 482.00>131.10 |
| 29 | Disperse Yellow 56 | 9.266 | 384.10>120.00 | 384.10>197.10 384.10>92.05 |
| 30 | Disperse Orange 1 | 9.713 | 319.10>169.10 | 319.10>122.00 319.10>181.05 |
| 31 | Disperse Yellow 23 | 9.82 | 303.10>77.05 | 303.10>104.95 303.10>181.15 |
| 32 | Basic Blue 26 | 9.843 | 470.30>454.20 | 470.30>349.20 470.30>333.10 |
| 33 | Sudan Dye I | 9.899 | 249.10>232.05 | 249.10>93.10 249.10>156.05 |
| 34 | Disperse Red 151 | 11.261 | 532.30>351.15 | 532.30>100.05 532.30>76.95 |
| 35 | Sudan Dye II | 12.115 | 277.10>121.10 | 277.10>106.05 277.10>156.05 |
| 36 | Sudan Dye III | 13.789 | 353.30>77.05 | 353.30>196.10 353.30>197.15 |
| 37 | Sudan Dye IV | 16.199 | 381.20>225.20 | 381.20>106.10 381.20>224.15 |
| 38 | Acid Orange 7 | 1.505 | 327.10>171.15 | 327.10>156.25 |
| 39 | Acid Yellow 36 | 2.47 | 352.10>156.10 | 352.10>79.95 |
| 40 | Acid Violet 49 | 2.641 | 710.30>170.10 | 710.30>524.40 710.30>260.45 |
| 41 | Disperse Yellow 1 | 4.647 | 274.20>244.05 | 274.20>226.10 274.20>166.10 |
| 42 | Disperse Yellow 9 | 4.749 | 273.10>242.15 | 273.10>226.20 273.10>213.10 |
| 43 | Disperse Yellow 7 | 10.74 | 315.10>210.15 | 315.10>106.10 315.10>181.15 |
| 44 | Disperse Orange 149 | 11.29 | 457.20>121.10 | 457.20>266.10 457.20>224.15 |

Fig. 15

Dye compounds Group2

| No | Dye name | RT(min) | Quantifier MRM transition | Reference MRM transition |
|---|---|---|---|---|
| 1 | Acid Red 26 (posi) | 3.079 | 437.00>121.10 | 437.00>355.15 437.00>105.95 |
| | Acid Red 26 | 3.079 | 435.10>355.10 | 435.10>301.95 435.10>194.05 |
| 2 | Acid Red 114 | 4.413 | 785.10>302.00 | 785.10>222.05 785.10>238.00 |
| 3 | Direct Red 28 (posi) | 3.433 | 653.20>188.15 | 653.20>308.15 653.20>389.15 |
| | Direct Red 28 | 3.434 | 325.20>152.15 | 325.20>81.05 325.20>416.20 |
| 4 | Direct Blue 6 | 2.67 | 421.20>249.00 | 421.20>185.10 421.20>250.00 |
| 5 | Direct Black 38 (posi) | 3.829 | 738.20>106.90 | 738.20>274.05 738.20>302.15 |
| | Direct Black 38 | 3.842 | 736.20>672.05 | 736.20>357.10 736.20>643.95 |
| 6 | Direct Brown 95 | 3.536 | 356.80>186.00 | 356.80>274.90 356.80>314.00 |
| 7 | Navy Blue | 4.581 | 901.00>440.00 | 901.00>343.15 901.00>197.05 |

Fig. 16

| Perfluorocompounds (PFCs) | | | | |
|---|---|---|---|---|
| No | Compound abbreviation | RT(min) | Quantifier MRM transition | Reference MRM transition |
| 1 | PFBA | 2.00 | 212.90>169.05 | — |
| 2 | PFPA | 3.02 | 262.90>219.05 | 262.90>219.05 |
| 3 | PFHxA | 3.68 | 313.00>269.05 | 313.00>269.05 |
| 4 | PFHpA | 4.20 | 362.90>319.10 | 362.90>169.10 / 362.90>119.05 |
| 5 | PFOA | 4.65 | 413.00>369.05 | 413.00>169.10 / 413.00>219.05 |
| 6 | PFNA | 5.04 | 463.00>419.00 | 463.00>219.05 / 463.00>169.10 |
| 7 | PFDA | 5.42 | 513.00>469.05 | 513.00>219.05 / 513.00>269.10 |
| 8 | PF-3,7-DMOA | 5.18 | 469.00>269.05 | 469.00>219.10 / 469.00>69.05 |
| 9 | PFUnA | 5.79 | 563.00>519.05 | 563.00>269.05 / 563.00>169.10 |
| 10 | PFDoA | 6.16 | 613.00>569.05 | 613.00>169.10 / 613.00>269.10 |
| 11 | PFTrDA | 6.51 | 663.00>619.00 | 663.00>169.10 / 663.00>219.10 |
| 12 | PFTeDA | 6.87 | 712.90>668.90 | 712.90>169.05 / 712.90>218.95 |
| 13 | PFOS | 5.58 | 499.00>98.90 | 499.00>79.95 / 499.00>230.00 |
| 14 | PFBS | 3.69 | 298.90>79.95 | 298.90>98.95 / 298.90>82.90 |
| 15 | PFHxS | 4.76 | 398.90>79.80 | 398.90>79.90 / 398.90>119.0 |
| 16 | PFHpS | 5.18 | 448.90>99.00 | 448.90>99.00 / 448.90>169.15 |
| 17 | L-PFDS | 6.33 | 599.00>79.95 | 599.00>99.00 / 599.00>130.00 |
| 18 | N-MeFOSA-M | 8.38 | 512.00>160.05 | 512.00>219.05 / 512.00>269.05 |
| 19 | N-EtFOSA-M | 8.71 | 526.00>169.05 | 526.00>219.05 / 526.00>269.05 |
| 20 | PFOSA | 7.05 | 498.00>77.95 | 498.00>169.00 / 498.00>477.85 |
| 21 | HPFHpA | 3.73 | 345.00>281.05 | 345.00>131.10 / 345.00>39.10 |
| 22 | H2PFDA/FOEA | 4.88 | 477.00>393.05 | 477.00>62.95 / 477.00>243.00 |
| 23 | H4PFUnA | 5.48 | 491.00>367.05 | 491.00>387.05 / 491.00>316.95 |
| 24 | H4PFOS | 4.47 | 427.00>407.00 | 427.00>80.95 / 427.00>80.05 |

Fig. 17

Alkylphenols (AP)

| No | Compound Abbreviation | RT(min) | Quantifier MRM transition | Reference MRM transition |
|---|---|---|---|---|
| 1 | NP | 4.60 | 219.2>133.1 | 219.2>117.0 |
| 2 | 4-n-NP | 5.51 | 219.2>105.6 | — |
| 3 | 4-n-OP | 3.80 | 205.2>133.1 | 205.2>116.9 |
| 4 | 4-t-OP | 4.83 | 205.2>106.0 | — |

Fig. 18

| No | Compound Name | RT (min) | Quantifier transition | Reference transition | Reference transition |
|---|---|---|---|---|---|
| 1 | NPEO (n=3) | 2.636 | 370.30>227.10 | 370.30>121.10 | |
| 2 | NPEO (n=4) | 2.624 | 414.30>271.15 | 414.30>397.30 | 414.30>121.05 |
| 3 | NPEO (n=5) | 2.615 | 458.30>441.35 | 458.30>315.20 | 458.30>121.10 |
| 4 | NPEO (n=6) | 2.604 | 502.40>485.30 | 502.40>359.20 | 502.40>133.05 |
| 5 | NPEO (n=7) | 2.584 | 546.40>529.35 | 546.40>133.05 | 546.40>89.10 |
| 6 | NPEO (n=8) | 2.571 | 590.40>573.35 | 590.40>133.05 | 590.40>291.20 |
| 7 | NPEO (n=9) | 2.551 | 634.50>133.10 | 634.50>617.40 | 634.50>89.10 |
| 8 | NPEO (n=10) | 2.533 | 678.50>133.00 | 678.50>89.05 | 678.50>291.20 |
| 9 | NPEO (n=11) | 2.515 | 722.50>133.05 | 722.50>89.00 | 722.50>291.20 |
| 10 | NPEO (n=12) | 2.498 | 766.50>133.00 | 766.50>89.00 | 766.50>291.20 |
| 11 | NPEO (n=13) | 2.48 | 810.60>133.05 | 810.60>89.00 | 810.60>291.20 |
| 12 | NPEO (n=14) | 2.462 | 854.60>133.00 | 854.60>89.05 | 854.60>177.05 |
| 13 | NPEO (n=15) | 2.448 | 898.60>133.05 | 898.60>89.00 | 898.60>177.20 |
| 14 | NPEO (n=16) | 2.434 | 942.60>132.80 | 942.60>89.00 | 942.60>131.10 |
| 15 | NPEO (n=17) | 2.418 | 986.70>89.00 | 986.70>133.10 | |

Fig. 19

| No | Compound Name | RT (min) | Quantifier transition | Reference transition | Reference transition |
|----|---------------|----------|----------------------|---------------------|---------------------|
| 16 | OPEO (n=3) | 2.372 | 356.30>226.70 | 356.30>120.80 | |
| 17 | OPEO (n=4) | 2.356 | 400.30>271.10 | 400.30>383.25 | 400.30>121.10 |
| 18 | OPEO (n=5) | 2.344 | 444.30>427.30 | 444.30>315.15 | 444.30>121.00 |
| 19 | OPEO (n=6) | 2.329 | 488.40>471.30 | 488.40>359.20 | 488.40>133.05 |
| 20 | OPEO (n=7) | 2.31 | 532.40>515.40 | 532.40>133.10 | 532.40>89.05 |
| 21 | OPEO (n=8) | 2.285 | 576.40>559.30 | 576.40>133.05 | 576.40>277.20 |
| 22 | OPEO (n=9) | 2.261 | 620.40>133.05 | 620.40>603.40 | 620.40>277.20 |
| 23 | OPEO (n=10) | 2.237 | 664.50>133.10 | 664.50>89.05 | 664.50>647.50 |
| 24 | OPEO (n=11) | 2.21 | 708.50>133.05 | 708.50>277.15 | 708.50>89.05 |
| 25 | OPEO (n=12) | 2.181 | 752.50>133.00 | 752.50>89.00 | 752.50>277.10 |
| 26 | OPEO (n=13) | 2.151 | 796.50>133.05 | 796.50>277.20 | 796.50>88.95 |
| 27 | OPEO (n=14) | 2.119 | 840.60>133.05 | 840.60>88.90 | 840.60>177.20 |
| 28 | OPEO (n=15) | 2.082 | 884.60>89.05 | 884.60>133.10 | 884.60>277.20 |
| 29 | OPEO (n=16) | 2.054 | 928.60>132.95 | 928.60>89.05 | 928.60>177.10 |

ANALYZING METHOD FOR AZO COMPOUND

CROSS REFERENCE TO RELATED APPLICATIONS

This application is a National Stage of International Application No. PCT/JP2019/042673 filed Oct. 30, 2019, claiming priority based on Singapore Patent Application No. 10201810673S filed Nov. 28, 2018.

TECHNICAL FIELD

The present invention relates to an analyzing method for quantitatively analyzing azo compounds contained in azo dyes used as synthetic dyes.

BACKGROUND ART

Various chemical substances are contained in clothes and other fiber products which are commonly worn in everyday life. Some of those substances are potentially hazardous to the human body and may cause health problems. In the present description, the term "hazardous substance" is used to refer to not only substances which have been proved to be hazardous to the human body but also substances which may possibly be harmful as well as those which have the potential to produce harmful substances through chemical reactions or similar processes.

One type of commonly known hazardous substances contained in fiber products is the substances which are used as synthetic dyes. Synthetic dyes are inexpensive and yet have excellent color-producing and fixing properties. Due to those characteristics, synthetic dyes have been widely used for the coloring of fiber or leather products. A high proportion of the synthetic dyes which are currently used worldwide are azo dyes which contain azo compounds as their main components.

Azo compounds are a type of organic compound having a structure which includes at least one azo group connecting two organic groups in the form of R—N=N—R'. There are more than 2000 kinds of azo compounds. It has been known that some of the azo compounds are reduced by bacterial actions on the human skin or in the human intestine, enzymatic actions inside the human body or other similar processes, to eventually produce primary aromatic amines (which may hereinafter be referred to as "PAAs" according to a conventional usage) which are known or suspected to be cancer-causing substances. Accordingly, the use of PAAs which have been identified as or suspected to be cancer-causing substances, as well as azo dyes containing azo compounds which produce PAAs, in fiber products and other daily necessities have been regulated in the European Union (EU) as well as many other countries or regions. For example, the EU has 22 substances designated as specific PAAs whose use must be regulated. Two more substances are added in China and Japan have, with a total of 24 substances under regulations.

The EU has the "REACH" regulation, which includes regulations concerning the registration, evaluation, authorization and restriction of chemicals which include hazardous substances, such as azo compounds and PAAs. Goods imported into the EU must be in conformity to REACH. As for worldwide evaluation standards concerning hazardous substances in fiber products, STANDARD 100 by OEKO-TEX, promoted by the OEKO-TEXt Association, has been commonly known, which comprehensively covers various fiber products ranging from raw fiber materials to finished textile products (see Non-Patent Literature 1). Manufacturers and other related parties have been required to obtain certification for conformity to this standard. Such regulations tend to be increasingly strengthened. Therefore, in recent years, the test for hazardous substances in fiber products has been even more important than before.

For the quantitative testing of azo compounds, gas chromatographs (GC), liquid chromatographs (LC), gas chromatograph mass spectrometers (GC-MS), liquid chromatograph mass spectrometers (LC-MS) and other similar devices have been generally used (for example, see Non-Patent Literature 2 or 3).

However, the conventional analyzing techniques have the following problems:
(1) The detection sensitivity is generally low. For some compounds, the sensitivity is considerably low.
(2) The influences of foreign substances cannot be sufficiently removed. The accuracy and sensitivity of the analysis for target compounds are easily affected by foreign substances.
(3) In order to avoid problems (1) and (2), it is necessary to change the type of analyzing device or analysis conditions for each compound, so that an inefficiently long period of time is required for the analysis.

CITATION LIST

Non Patent Literature

Non Patent Literature 1: "What is STANDARD 100 by OEKO-TEX?", [online], [accessed on Oct. 15, 2018], the Internet Non Patent Literature 2: "Developing a method for the analysis of Azo Dyes using the Agilent 1290 Infinity LC Method Development System and the Agilent Method Scouting Wizard software", [online], [accessed on Oct. 15, 2018], the Internet Non Patent Literature 3: "Excellent Resolution of EU-Regulated Azo Dye Aryl Amines by GC-MS on the Rxi-35Sil MS GC Column", [online], [accessed on Oct. 18, 2018], the Internet

SUMMARY OF INVENTION

Technical Problem

In recent years, regulations on the use of hazardous substances, inclusive of azo compounds, have been even stricter, particularly in the EU and other countries or regions which are primary importers of fiber products. Accordingly, in the countries exporting fiber products, it has been increasingly necessary to test for hazardous substances in fiber products. However, in the current situation, the test requires a considerable amount of time and an accordingly high amount of cost, which unfavorably leads to higher prices of the fiber products or insufficient profits from those products. Conducting the analysis with a low level of accuracy or sensitivity lowers the reliability of the test and hinders the export of fiber products.

Azo compounds are also generally banned or regulated in other targets, such as industrial waste water, environmental water (e.g. river water), as well as goods other than fiber products, such as daily necessities or toys, although there are differences in criteria. Accordingly, the previously described situation also roughly applies in the testing for the azo compounds in those targets.

The present invention has been developed to solve the previously described problems. Its objective is to provide an analyzing method for azo compounds by which a quantitative analysis of a large number of kinds of azo compounds in fiber products and various other samples can be efficiently performed with a high level of accuracy and sensitivity.

Solution to Problem

The first aspect of the present invention developed for solving the previously described problem is a method for analyzing a plurality of kinds of azo compounds in a sample, the analyzing method including:
  a first analyzing step in which a first analysis is performed for a target sample to detect a plurality of azo compounds in the sample, using a liquid chromatograph in which a liquid chromatograph with a reverse phase column, the liquid chromatograph being coupled with a mass spectrometer; and
  a second analyzing step in which a second analysis is performed for the target sample to detect a plurality of azo compounds which are contained in the sample, using a liquid chromatograph in which a liquid chromatograph with a reverse phase column, the liquid chromatograph being coupled with a mass spectrometer,
where:
  the first analyzing step is a gradient analysis using, as two mobile phases, a first mobile phase which is either an aqueous ammonium acetate solution or an aqueous ammonium formate solution, and a second mobile phase which is a mixture of an organic solvent and either an aqueous ammonium acetate solution or an aqueous ammonium formate solution; and
  the second analysis is a gradient analysis using, as two mobile phases, a first mobile phase which is an aqueous solution of ammonia or ammonium salt with pH greater than 7.0, and a second mobile phase which is an organic solvent.

The second aspect of the present invention developed for solving the previously described problem is a method for analyzing a plurality of kinds of azo compounds in a sample, the analyzing method including:
  an analyzing step in which a predetermined analysis is performed for a target sample to detect a plurality of azo compounds in the sample, using a liquid chromatograph in which a liquid chromatograph with a reverse phase column, the liquid chromatograph being coupled with a mass spectrometer,
  where the predetermined analysis is a gradient analysis using, as two mobile phases, a first mobile phase which is either an aqueous ammonium acetate solution or an aqueous ammonium formate solution, and a second mobile phase which is a mixture of an organic solvent and either an aqueous ammonium acetate solution or an aqueous ammonium formate solution.

The third aspect of the present invention developed for solving the previously described problem is a method for analyzing a plurality of kinds of azo compounds in a sample, the analyzing method including:
  an analyzing step in which a predetermined analysis is performed for a target sample to detect a plurality of azo compounds in the sample, using a liquid chromatograph in which a liquid chromatograph with a reverse phase column, the liquid chromatograph being coupled with a mass spectrometer,
  where the predetermined analysis is a gradient analysis using, as two mobile phases, a first mobile phase which is an aqueous solution of ammonia or ammonium salt with pH greater than 7.0, and a second mobile phase which is an organic solvent.

The analyzing method according to the first aspect of the present invention may further include a processing step for determining a quantitative value for each of the plurality of azo compounds in the sample, based on analysis results obtained by the first analyzing step and the second analyzing step. The analyzing method according to the second or third aspect of the present invention may further include a processing step for determining a quantitative value for each of the plurality of azo compounds in the sample, based on an analysis result obtained by the analyzing step. According to these methods, a quantitative analysis of a large number of azo compounds contained in a sample can be efficiently performed with a high level of accuracy and sensitivity. If a quantitative value of zero is obtained for a known kind of azo compound by the quantitative analysis, it is naturally possible to estimate that the compound concerned is not contained (or is lower than the lower detection limit).

In any of the first through third aspects of the present invention, a typical example of the target sample is a liquid sample prepared by extracting a substance from a fiber product in a solution. In that case, the present invention may include a sample preparation step in which a liquid sample as the aforementioned sample is prepared by extracting a substance from a fiber product in a solution.

It should be noted that azo dyes which contain azo compounds are used, or may possibly be used, in various products other than fiber products. In general, those other products also have many kinds of azo compounds whose uses are regulated or banned. Therefore, samples prepared from those various products which are not fiber products can also be the target of the analysis in the present invention. For similar reasons, tap water, well water, river water and other types of environmental water can also be the target of the analysis.

The plurality of azo compounds to be detected in the present invention may be azo compounds whose uses are banned or regulated by the EU. Oeko-Tex or other organizations.

Specifically, the azo compounds to be detected in the first analysis in the first aspect of the present invention as well as in the second aspect of the present invention may include azo compounds contained in 44 kinds of azo dyes which respectively have the following color index substance names: Basic Red 9, Disperse Blue 1, Basic Violet 14, Disperse Blue 7, Disperse Blue 3, Disperse Red 11, Disperse Blue 102, Disperse Red 17, Disperse Yellow 39, Disperse Blue 106, Solvent Yellow 1, Disperse Orange 3, Disperse Yellow 3, Disperse Brown 1, Disperse Orange 11, Basic Green 4, Disperse Red 1, Disperse Blue 35, Disperse Yellow 49, Basic Violet 1, Solvent Yellow 3, Disperse Blue 124, Basic Violet 3, Solvent Yellow 2, Disperse Orange 37/76, Michler's Base, Disperse Blue 26, Disperse Orange 61, Disperse Yellow 56, Disperse Orange 1, Disperse Yellow 23, Basic Blue 26, Sudan Dye I, Disperse Red 151, Sudan Dye II, Sudan Dye III, Sudan Dye IV, Acid Orange 7, Acid Yellow 36, Acid Violet 49, Disperse Yellow 1, Disperse Yellow 9, Disperse Yellow 7 and Disperse Orange 149.

On the other hand, the azo compounds to be detected in the second analysis in the first aspect of the present invention as well as in the third aspect of the present invention may include azo compounds contained in seven kinds of azo dyes which respectively have the following color index substance names: Acid Red 26, Acid Red 114, Direct Red 28, Direct Blue 6, Direct Black 38, Direct Brown 95 and Navy Blue 1.

The 44 kinds of azo dyes listed earlier may be divided into a group including seven kinds of azo dyes named Acid Orange 7, Acid Yellow 36, Acid Violet 49, Disperse Yellow 1, Disperse Yellow 9, Disperse Yellow 7 and Disperse Orange 149 which contain azo compounds to be analyzed in a negative ionization mode in the mass spectrometer, and another group including the other 37 kinds of azo dyes which contain azo compounds to be analyzed in a positive ionization mode in the mass spectrometer.

The azo compounds contained in the seven kinds of azo dyes listed earlier may all be analyzed in a negative ionization mode in the mass spectrometer. However, as for the three azo dyes named Acid Red 26, Direct Red 28 and Direct Black 38, it is possible to perform the analysis in both positive and negative ionization modes, and adopt an analysis result obtained with a higher level of sensitivity.

In the first analysis in the first aspect of the present invention as well as in the second aspect of the present invention, a two-liquid gradient elution is performed, in which both mobile phases to be mixed with each other are acidic (weakly acidic) solutions containing either ammonium acetate or ammonium formate. Typically, the gradient elusion is performed so that the concentration of the organic solvent gradually increases with the lapse of time from the point of injection of the sample into the mobile phase. During the entire elution period, the mobile phase is maintained in a weakly acidic state. That is to say, a two-liquid gradient elution under an acidic condition is performed in this analysis. The 44 kinds of azo dyes (azo compounds) listed earlier beginning with Basic Red 9 cannot be completely separated from each other by this elution. However, compounds whose retention times are comparatively close to each other can eventually be detected in a sufficiently separated form due to their difference in mass-to-charge ratio or multiple reaction monitoring (MRM) transition.

The gradient elution in the second analysis in the first aspect of the present invention as well as in the third aspect of the present invention is also a two-liquid gradient elution. A difference from the first analysis in the first aspect of the present invention exists in that ammonia or ammonium salt, both of which are basic in nature, is used as an additive which acts as a buffering agent. That is to say, a two-liquid gradient elution under a neutral or weakly basic condition is performed in this analysis. The seven kinds of azo dyes (azo compounds) listed earlier beginning with Acid Red 26 are highly acidic dyes having sodium sulfonate. It is likely that such compounds cannot be satisfactorily ionized and will not be easily detected if a mobile phase under an acidic condition as described earlier is used. By comparison, the use of a neutral or weakly basic mobile phase in place of the acidic one enables both satisfactory separation and high-sensitivity detection of the seven azo dyes.

In the analyzing method according to the present invention, if a selected ion monitoring (SIM) measurement or MRM measurement is performed for each target compound, an extracted ion chromatogram (which is also conventionally called a "mass chromatogram") can be created from the measured result. If a target compound is contained in the sample, a peak appears on the extracted ion chromatogram corresponding to that compound. In that case, it is possible to compute the area or height of that peak and calculate the concentration or amount of the contained compound from the value of the area or height of the peak with reference to a previously created calibration curve. For example, in the case of a compound whose amount of use is regulated, the calculated amount of the compound can be compared with a regulatory value to determine whether or not the compound falls within a permissible range. For a compound whose use is banned, what is necessary is to simply determine whether or not that compound has been detected.

The mass spectrometer in the liquid chromatograph mass spectrometer used for an analysis according to the present invention may be a common type of mass spectrometer in which no ion-dissociating operation is performed. However, it is preferable to use a tandem mass spectrometer capable of an MRM measurement. In that case, a mass spectrometric analysis for an MRM transition specified for each azo compound can be performed in the mass spectrometer in the first analysis and the second analysis.

For example, the tandem mass spectrometer may be a triple quadrupole mass spectrometer, quadrupole time-of-flight (Q-TOF) mass spectrometer, ion trap mass spectrometer, or ion trap time-of-flight (IT-TOF) mass spectrometer. If a Q-TOF mass spectrometer or IT-TOF mass spectrometer is used, ion-intensity data for a specific MRM transition can be obtained in an effectively similar manner to the MRM measurement by extracting intensity data for a product ion having a specific mass-to-charge ratio (m/z) value from the obtained product-ion spectrum data.

Advantageous Effects of Invention

According to the present invention, a large number of kinds of azo compounds contained in fiber products or various other samples can be efficiently analyzed with a high level of accuracy and sensitivity. In particular, according to the first aspect of the present invention, major azo compounds which are typical hazardous substances can be almost exhaustively analyzed by two analyses. This improves the efficiency of the test for the azo compounds and reduces the cost required for the test.

BRIEF DESCRIPTION OF DRAWINGS

FIG. 5 is a list of the substances to be analyzed in a simultaneous analysis method for specific aromatic amines.

FIG. 6 is a list of the substances to be analyzed in a simultaneous analysis method for the first group of azo dyes.

FIG. 7 is a list of the substances to be analyzed in a simultaneous analysis method for the first group of azo dyes.

FIG. 8 is a list of the substances to be analyzed in a simultaneous analysis method for the second group of azo dyes.

FIG. 9 is a list of the substances to be analyzed in a simultaneous analysis method for PFCs.

FIG. 10 is a list of the substances to be analyzed in a simultaneous analysis method for AP.

FIG. 11 is a list of the substances to be analyzed in a simultaneous analysis method for APEO.

FIG. 12 is a table showing the MS/MS analysis conditions for each substance in the simultaneous analysis method for specific aromatic amines.

FIG. 13 is a table showing the MS/MS analysis conditions for each substance in the simultaneous analysis method for the first group of azo dyes.

FIG. 14 is a table showing the MS/MS analysis conditions for each substance in the simultaneous analysis method for the first group of azo dyes.

FIG. 15 is a table showing the MS/MS analysis conditions for each substance in the simultaneous analysis method for the second group of azo dyes.

FIG. 16 is a table showing the MS/MS analysis conditions for each substance in the simultaneous analysis method for PFCs.

FIG. 17 is a table showing the MS/MS analysis conditions for each substance in the simultaneous analysis method for AP.

FIG. 18 is a table showing the MS/MS analysis conditions for each substance in the simultaneous analysis method for APEO.

FIG. 19 is a table showing the MS/MS analysis conditions for each substance in the simultaneous analysis method for APEO.

DESCRIPTION OF EMBODIMENTS

One embodiment of the analyzing method for azo compounds according to the present invention is hereinafter described with reference to the attached drawings.

<Configuration of System for Carrying Out Analyzing Method According to One Embodiment of Present Invention>

Figure 1:
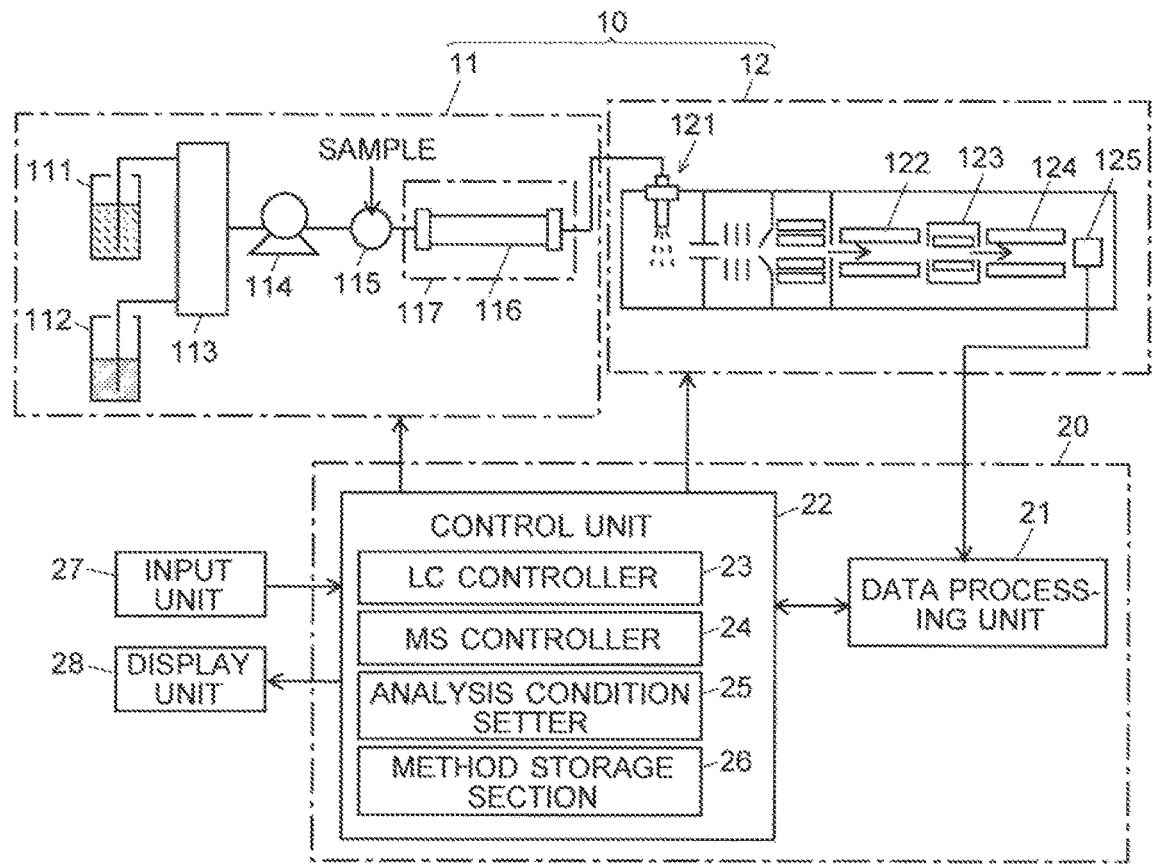
FIG. 1 is a schematic configuration diagram of one example of an analyzing system for carrying out an analyzing method according to the present invention.

FIG. 1 is a schematic configuration diagram of one example of an analyzing system for carrying out an analyzing method according to the present embodiment. In principle, the present analyzing system is a system for testing for hazardous substances (e.g. azo compounds) in fiber products, although the system can also be used for the testing of other objects, such as daily necessities, toys or environmental water.

As shown in FIG. 1, the present analyzing system includes, as the measurement section 10, a liquid chromatograph mass spectrometer including a liquid chromatograph (LC) unit 11 and a triple quadrupole mass spectrometer (MS/MS) unit 12. It also includes a control unit 22 for controlling the operations of the LC unit 11 and the MS/MS unit 12, a data processing unit 21 for processing data obtained with the MS/MS unit 12, as well as an input unit 27 and a display unit 28 serving as the user interface.

The LC unit 11 includes: two mobile phase containers 111 and 112 which respectively contain different kinds of mobile phases; a mixer 113 for mixing two kinds of mobile phases at a predetermined mixture ratio: a liquid supply pump 114 for supplying the mobile phase mixed by the mixer 113; an injector 115 for injecting a predetermined amount of liquid sample into the mobile phase; a column 116 for temporally separating the substances in the liquid sample; and a column oven 117 for controlling the temperature of the column 116.

The MS/MS unit 12 includes: an ESI ion source 121 for ionizing the substances in the introduced liquid sample by an electrospray ionization (ESI) method; a front quadrupole mass filter 122 for selectively allowing an ion having a specific mass-to-charge ratio (m/z) value to pass through as the precursor ion; a collision cell 123 for dissociating the precursor ion by collision induced dissociation (CID); a rear quadrupole mass filter 124 for selectively allowing a product ion having a specific m/z value to pass through among the various kinds of product ions generated by CID; and an ion detector 125 for detecting ions. A dual ion source (DUIS), which is capable of simultaneously performing electrospray ionization and atmospheric pressure chemical ionization, may be used in place of the ESI ion source 121.

The control unit 22 includes an LC controller 23, MS controller 24, analysis condition setter 25, method storage section 26 and other functional blocks. The data processing unit 21 includes an analogue-to-digital converter for digitizing ion-intensity signals received from the ion detector 125 of the MS/MS unit 12. The data processing unit 21 calculates a quantitative value (content or concentration value) for each of the predetermined kinds of hazardous substances based on the data obtained with the analogue-to-digital converter. The same unit 21 also determines whether or not the calculated quantitative value exceeds a prescribed regulatory value, and outputs the determination result along with the quantitative value.

The control unit 22 and data processing unit 21 are actually a personal computer, which is denoted by reference sign 20 in FIG. 1. The functions of the data processing unit 21 and the control unit 22 are achieved by executing, on the personal computer, a dedicated controlling and processing program installed on the same computer.

Figure 2:
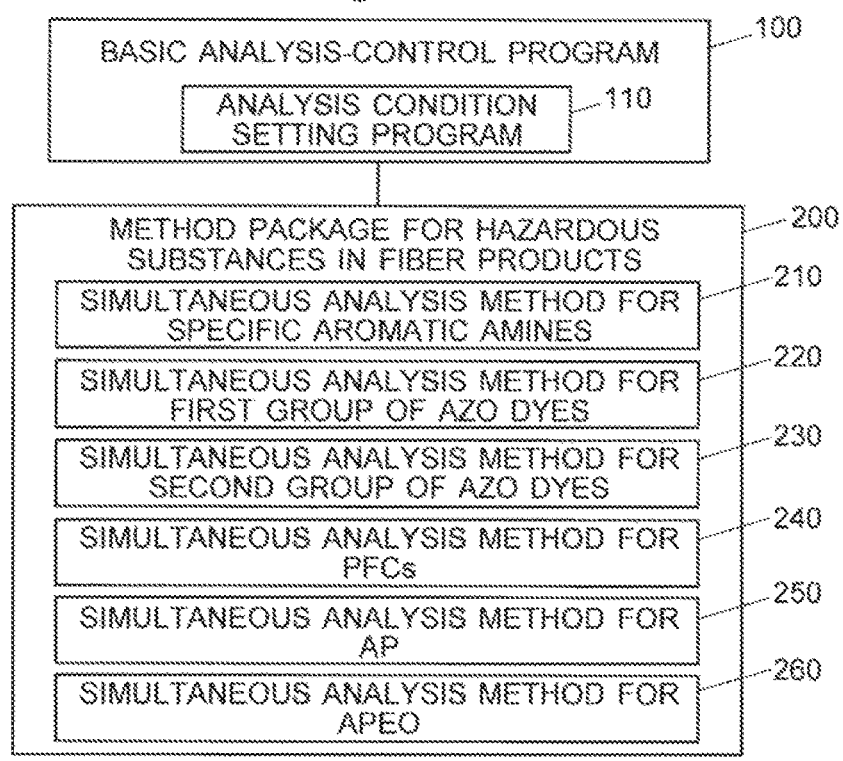
FIG. 2 is a schematic diagram showing the contents of the controlling and processing application software installed in a computer in the analyzing system shown in FIG. 1.

FIG. 2 is a schematic diagram showing the contents of the application software and method package installed in the personal computer 20 in the present analyzing system. A basic analysis-control program 100 is a piece of basic software for making the computer execute (1) basic controls for carrying out analysis operations in the measurement section 10, and (2) data processing to be performed in the data processing unit 21. The basic analysis-control program 100 includes an analysis condition setting program 110 having the function of allowing users to enter various parameters and analysis conditions which are necessary for an analysis. The basic analysis-control program 100 is a program which is always used in an analysis regardless of what kind of sample is to be analyzed, i.e. which is also used in the case of performing an analysis according to a method that is not included in the method package (which will be described later).

In the present analyzing system, a number of measurement methods specifically prepared for an exhaustive quantitative analysis for major hazardous substances in fiber products are compiled into a "method package 200 for hazardous substances in fiber products" and introduced into the personal computer 20. This method package 200 is stored in the method storage section 26. Each analysis method in the method package 200 includes control information, such as the analysis conditions and parameters which are suitable for quantitatively analyzing a plurality of specific substances (these analysis conditions and parameters will be hereinafter simply called the "analysis conditions").

Specifically, each analysis method includes the following items of information as the analysis conditions in the LC unit 11: type of column, kind of mobile phase, gradient elution conditions (gradient program), flow rate (or flow velocity) of the mobile phase, temperature of the column oven, and amount of sample injection. Each analysis method also includes the following items of information as the analysis conditions in the MS/MS unit 12: type of ion source (type of ionization method), ionization mode (either the positive or negative ionization mode), temperatures of the ion source, desolvation tube and other related elements, flow rate of the nebulizer gas in the ion source or other kinds of gas, retention time of each substance to be detected, MRM transitions (m/z values of the precursor ion and the product ion) of the target ion (or quantifier ion) and the qualifier ion (or reference ion) for each substance to be detected, collision energy corresponding to each MRM transition, as well as DC bias voltages to be respectively applied to relevant components, such as a quadrupole mass filter.

<Details of Method Package for Hazardous Substances in Fiber Products>

The method package 200 for hazardous substances in fiber products in the present analyzing system includes the following six analysis methods: simultaneous analysis method 210 for specific aromatic amines, simultaneous analysis method 220 for the first group of azo dyes, simultaneous analysis method 230 for the second group of azo dyes, simultaneous analysis method 240 for PFCs, simultaneous analysis method 250 for AP, and simultaneous analysis method 260 for APEO.

The kinds of substances or compounds to be analyzed in each analysis method, as well as the main analysis conditions, will be hereinafter described.

[1] Simultaneous Analysis Method for Specific Aromatic Amines 210

The substances to be analyzed by this analysis method are major kinds of primary aromatic amines (PAAs) commonly known as hazardous substances, which are specifically 24 compounds listed in FIG. 5. They include 22 kinds of compounds whose uses are currently regulated in the EU, along with two kinds of compounds additionally regulated in Japan and China. FIG. 5 shows the compound name, molecular formula. CAS number and exact mass for each compound.

The main LC analysis conditions in the present analysis method are as follows:
Column type: ODS column (specifically, Shim-pack FC-ODS 3 μm C18 100 A, 150 mm L×2 mm I.D., manufactured by Shimadzu GLC Ltd.)
Mobile phase A: water with 5 mM ammonium acetate (pH 3.0)
Mobile phase B: acetonitrile
Analysis period: 13 minutes
Gradient elution conditions (Gradient program): 2% mobile phase B (0.00 min. to 1.00 min.)→100% mobile phase B (6.00 min. to 9.00 min.)→35% mobile phase B (9.01 min. to 13.00 min.)

The retention time and MRM transitions, which are the main MS/MS analysis conditions in the present analysis method, are as shown in FIG. 12. In principle, the MRM transition of one quantifier ion and those of two reference ions (which are ions to be used for determining whether or not the quantifier ion is certainly the target substance, based on their ion-intensity ratios to the quantifier ion) are specified for each compound. The ionization mode is positive for all substances.

[2] Simultaneous Analysis Method for the First Group of Azo Dyes 220

The substances to be analyzed by this analysis method are azo dyes containing major azo compounds which produce PAAs mentioned earlier. Specifically, a total of 44 kinds of dyes listed in FIGS. 6 and 7 are included in this group. There are many kinds of azo dyes whose uses are regulated due to their hazardous natures, and it is difficult to detect all of them by a single analysis under the same analysis conditions. Accordingly, the major azo compounds have been divided into the first group (44 kinds) and second group (7 kinds) so that the azo dyes can be detected under different analysis conditions for each group. FIGS. 6 and 7 show the dye name (color index substance name), molecular formula of the contained azo compound, CAS number and exact mass for each dye.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: water with 5 mM ammonium acetate
Mobile phase B: acetonitrile:water (9:1) with 5 mM ammonium acetate
Analysis period: 20 minutes
Gradient elution conditions (Gradient program): 35% mobile phase B (0.00 min. to 0.50 min.)→100% mobile phase B (12.00 min. to 17.00 min.)→35% mobile phase B (17.10 min. to 20.00 min.)

Figure 3:
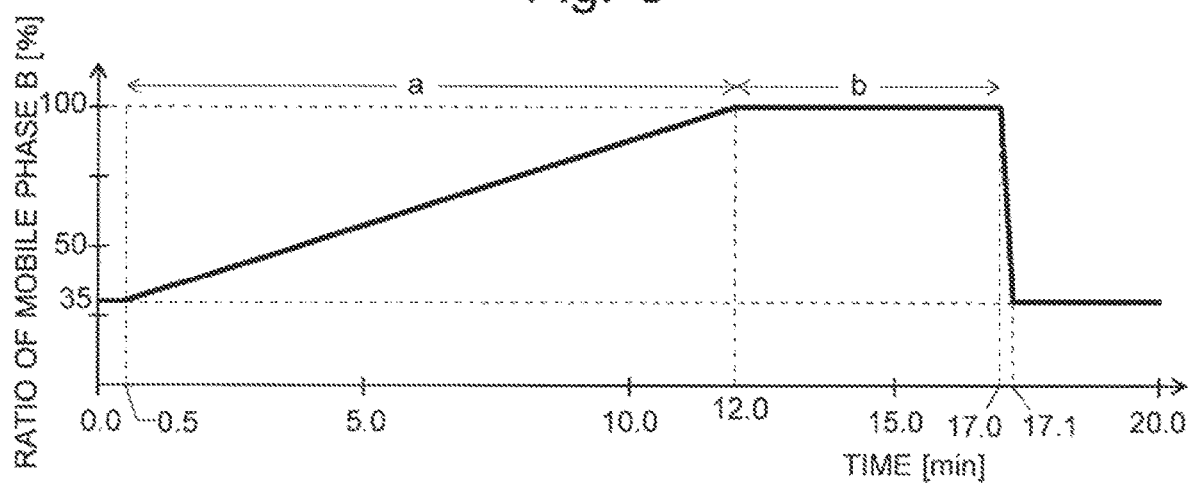
FIG. 3 is a graph showing a gradient program used in the simultaneous analysis method for the first group of azo dyes performed in the analyzing system in the present example.

FIG. 3 is a graph showing the temporal change in the mixture ratio of the mobile phase B based on the previously described gradient elution condition. Ammonium acetate, which is added to both mobile phases A and B, is a commonly used additive for making a mobile phase be acidic. Accordingly, in the present analyzing method, the mixed mobile phase is constantly maintained in a weakly acidic state throughout the entire analysis period regardless of the mixture condition of the two mobile phases. The concentration of acetonitrile, which is an organic solvent, is linearly increased while the lapse time from the sample injection is within a range from 0.50 minutes to 12.00 minutes.

The retention time and MRM transitions, which are the main MS/MS analysis conditions in the present analysis method, are as shown in FIGS. 13 and 14. In principle, the MRM transition of one quantifier ion and those of two reference ions are specified for each compound, although only one reference ion is specified for some compounds for which two or more appropriate reference ions cannot be selected. In the present method, the ionization mode is switched in the middle of the analysis so that the 37 compounds from Nos. 1 to 37 in FIGS. 13 and 14 are analyzed in the positive ionization mode, while the remaining seven compounds from No. 38 to No. 44 are analyzed in the negative ionization mode.

Simultaneous Analysis Method for the Second Group of Azo Dyes 230 The substances to be analyzed by this analysis method are azo dyes containing azo compounds that cannot be properly analyzed by the simultaneous analysis method for the first group of azo dyes 220. Specifically, seven kinds of azo dyes listed in FIG. 8 are included in this group. Similar to FIGS. 6 and 7, FIG. 8 shows the dye name, molecular formula of the contained azo compound, CAS number and exact mass for each dye.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: water with 5 mM ammonium bicarbonate
Mobile phase B: acetonitrile
Analysis period: 10 minutes Gradient elution conditions (Gradient program): 2% mobile phase B (0.00 min. to 0.50 min.)→90% mobile phase B (6.00 min. to 7.50 min.)→2% mobile phase B (7.51 min. to 10.00 min.)

Compared to ammonium acetate, ammonium bicarbonate added to the mobile phase A has a higher pH (weakly alkaline, with pH higher than 7.0). This additive is commonly used for making the pH of a mobile phase be within a range from neutrality to weak alkalinity. The simultaneous analysis method for the second group of azo dyes 230 is identical to the simultaneous analysis method for the first group of azo dyes 220 in terms of the type of column, but is totally different from the latter in terms of the kinds of mobile phases and the gradient elution condition.

Figure 4:
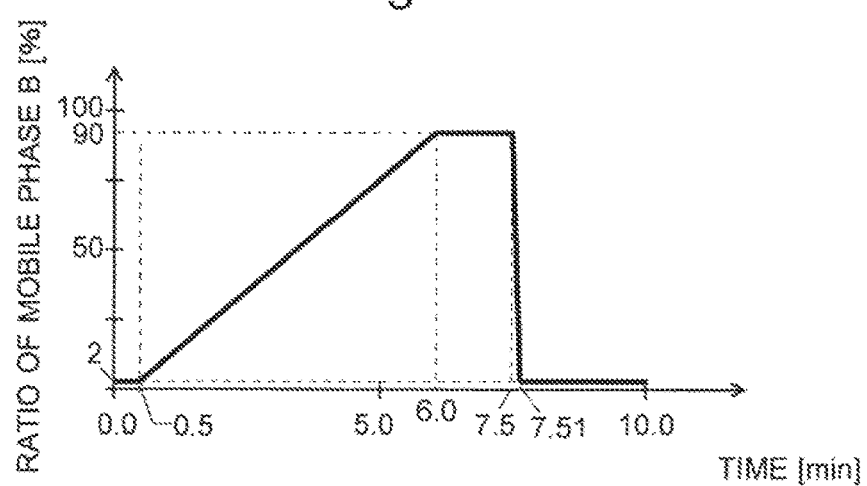
FIG. 4 is a graph showing a gradient program used in the simultaneous analysis method for the second group of azo dyes performed in the analyzing system in the present example.

FIG. 4 is a graph showing the temporal change in the mixture ratio of the mobile phase B based on the previously described gradient elution condition. In the present analysis method, the mixed mobile phase is constantly maintained in a neutral or weakly basic state throughout the entire analysis period regardless of the mixture condition of the two mobile phases. The concentration of acetonitrile, which is an organic solvent, is linearly increased while the lapse time from the sample injection is within a range from 0.50 minutes to 6.00 minutes.

The retention time and MRM transitions, which are the main MS/MS analysis conditions in the present analysis method, are as shown in FIG. 15. It should be noted that the analyses for three dyes named "Acid Red 26", "Direct Red 28" and "Direct Black 38" are each performed in both positive and negative ionization modes. Consequently, 10 detection results are obtained for the seven kinds of substances. The detection sensitivity for these three aforementioned dyes may be higher in either the positive ionization mode or the negative ionization mode, depending on an instrumental error of the device or some conditions other than the ionization mode. Therefore, the analysis for those dyes is performed in each of the positive and negative ionization modes, and a result obtained with a higher level of sensitivity is adopted. As for the other four dyes, the sensitivity in the negative ionization mode is normally higher than in the positive ionization mode. Therefore, the analysis is only performed in the negative ionization mode.

[4] Simultaneous Analysis Method for PFCs 240

The substances to be analyzed by this analysis method are perfluoro compounds whose uses are banned or regulated by the EU, Oeko-Tex or other organizations. Specifically, they are the 24 kinds of compounds listed in FIG. 9. FIG. 9 shows the compound name, abbreviation, molecular formula, CAS number and exact mass for each compound.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: water with 5 mM ammonium acetate
Mobile phase B: acetonitrile
Analysis period: 13 minutes
Gradient elution conditions (Gradient program): 10% mobile phase B (0.00 min. to 0.50 min.)→85% mobile phase B (8.50 min.)→95% mobile phase B (8.60 min. to 10.00 min.)→10% mobile phase B (10.10 min. to 13.00 min.)

The retention time and MRM transitions, which are the main MS/MS analysis conditions in the present analysis method, are as shown in FIG. 16. The ionization mode is negative for all substances.

[5] Simultaneous Analysis Method for AP 250

The substances to be analyzed by this analysis method are alkylphenols whose uses are regulated in the EU and other countries or regions. Specifically, they are the four kinds of compounds listed in FIG. 10. FIG. 10 shows the compound name, abbreviation, molecular formula, and exact mass for each compound.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: water
Mobile phase B: acetonitrile
Analysis period: 11 minutes
Gradient elution conditions (Gradient program): 50% mobile phase B (0.00 min. to 0.50 min.)→95% mobile phase B (7.00 min. to 9.00 min.)→50% mobile phase B (9.10 min. to 11.00 min.)

The retention time and MRM transitions, which are the main MS/MS analysis conditions in the present analysis method, are as shown in FIG. 17. The ionization mode is negative for all substances. In the present case, only one reference ion can be selected for two kinds of compounds: NP and 4-n-OP. No reference ion is used for 4-n-NP and 4-t-OP, since no proper reference ion can be selected for these two compounds.

[6] Simultaneous Analysis Method for APEO 260

The substances to be analyzed by this analysis method are alkylphenol ethoxylates, which have the potential to produce alkylphenols mentioned earlier. Specifically, they are the two kinds of compounds listed in FIG. 11, i.e. NPEO and OPEO. It should be noted that each of these two kinds of compounds has many homologs which differ from each other in the number of $C_2H_4O$, n. Those homologs have different masses. Accordingly, the substances to be detected in the present case are limited to the homologs of NPEO with n ranging from 3 to 17 and those of OPEO with n ranging from 3 to 16. A different MRM transition is set for each of those homologs.

The main LC analysis conditions in the present analysis method are as follows:
Column type: ODS column (specifically, Shim-pack FC-ODS 3 μm C18 100 A, 75 mm L×2 mm I.D., manufactured by Shimadzu GLC Ltd.)
Mobile phase A: Water with 10 mM ammonium acetate (pH 3.6)
Mobile phase B: acetonitrile
Analysis period: 7 minutes
Gradient elution conditions (Gradient program): 70% mobile phase B (0.00 min. to 1.00 mm.)→95% mobile phase B (1.01 min. to 5.00 min.)→70% mobile phase B (5.10 min. to 7.00 min.)

The retention time and MRM transitions, which are the main MS/MS analysis conditions in the present analysis method, are as shown in FIGS. 18 and 19. The ionization mode is positive for all substances.

The type of column is the OSD column in all six analysis methods. However, the column length is not the same: 150 mm for the simultaneous analysis method for specific aromatic amines, and 75 mm for the other methods. Accordingly, when an analysis using the simultaneous analysis method for specific aromatic amines is to be performed, the operator must replace the column with another one, or select the column to be used from among a plurality of columns arranged parallel to each other in a selectable form. The operator also needs to prepare mobile phases for each analysis method.

As described earlier, the analysis methods 210-260 included in the method package 200 for hazardous substances in fiber products respectively contain different LC analysis conditions and MS/MS analysis conditions. In an execution of an analysis, the basic analysis-control program 100 controls the operations of the relevant components according to the analysis conditions contained in the analysis methods 210-260.

Though not shown in FIGS. 12-19, optimum values of the collision energy (which is practically the DC bias voltage applied to the ion guide placed within the collision cell 123, for example), DC bias voltages applied to the quadrupole mass filters 122 and 124, and other parameters are also specified for each MRM transition.

In each of the previously describe analysis methods, a reverse phase column which is different from an ODS column may also be used as the column. The organic solvent used for the mobile phases is not limited acetonitrile: for example, methanol or other appropriate solvents may also be used. Ammonium formate may be used in place of ammonium acetate used as an additive to the mobile phases. Ammonia or ammonium salt with pH higher than 7.0 may be used in place of ammonium bicarbonate used as an additive to the mobile phases.

<Procedure and Processing for Analysis of Hazardous Substances>

The procedure and processing for carrying out a test for hazardous substances in fiber products using the present analyzing system are hereinafter described.

An operator prepares a liquid sample for the analysis from a fiber product to be analyzed. This sample preparation task is performed by the operator according to an ordinary procedure using a conventional method: The fiber product to be analyzed is initially divided into predetermined sizes (weights). The obtained pieces are placed in a centrifuge tube. After a predetermined amount of methanol is injected into the centrifuge tube, the tube is ultrasonically vibrated at a predetermined temperature for a predetermined period of time to promote the extraction of components from the fiber pieces. A centrifugal separation is subsequently performed. The obtained extract is temporarily dried and subsequently dissolved in a predetermined solvent to once more form a solution. This solution is passed through a filter to remove fine impurities and eventually obtain the liquid sample.

The liquid sample prepared in the previously described manner is subjected to an analysis using the present analyzing system as follows: The operator determines which one of the six analysis methods described earlier should be used for the analysis, prepares mobile phases corresponding to the selected analysis method, and sets them in the LC unit 11. If the column needs to be replaced, the operator also replaces the column with another one corresponding to the selected analysis method. Then, the operator performs a predetermined operation using the input unit 27 to execute the basic analysis-control program 100 on the personal computer 20. Upon execution of the analysis condition setting program 110 in the basic analysis-control program 100, the analysis condition setter 25 begins to operate and displays a window on the display unit 28 which allows the operator to select and indicate one of the six analysis methods stored in the method storage section 26. This window includes a list showing the names of the six analysis methods. The operator selects the analysis method to be executed and issues a command to initiate the measurement.

Upon receiving the command to initiate the measurement, the LC controller 23 and the MS controller 24 read their respective analysis conditions specified in the selected analysis method, and control relevant components in the LC unit 11 and the MS/MS unit 12 according to the parameter values and other items of information in the analysis conditions.

As one example, consider the case where the operator has selected the simultaneous analysis method for the first group of azo dyes and issued the command to initiate the measurement.

In response to the command to initiate the measurement, the LC controller 23 controls the mixer 113 in the LC unit 11 so that the mobile phases A and B will initially be mixed at a ratio of 65% to 35% and supplied to the column 116. This mixture ratio is maintained until the lapse of 0.50 minutes from the point in time where the liquid sample was injected through the injector 115 into the mobile phase (0.00 minute). While the lapse time is within a range from 0.50 minutes to 12.00 minutes, the mixer 113 is controlled so that the mixture ratio of mobile phase B linearly increases from 35% to 100%. This mixture ratio (mobile phase B:100%) is maintained while the lapse time is within a range from 12.0) minutes to 17.00 minutes. While the lapse time from the point of injection of the liquid sample is within a range from 17.00 minutes to 17.10 minutes, the mixer 113 is controlled so that the mixture ratio of mobile phase B linearly decreases from 100% to 35%. This mixture ratio (mobile phase B:35%) is maintained from 17.10 minutes on.

As noted earlier, the mixed mobile phase is constantly maintained in the weakly acidic state, since both mobile phases A and B contain ammonium acetate. As the mixture ratio of the mobile phase B linearly increases, the acetonitrile concentration in the mixed mobile phase also linearly increases. If the liquid sample contains one or more of the azo compounds corresponding to the 44 azo dyes shown in FIGS. 6 and 7, each azo compound will be separated from the other compounds according to its retention time, as the mixture ratio of the mobile phases A and B is varied with time in the previously described manner.

If the acetonitrile concentration were not increased, compounds which are slower to be eluted would be significantly delayed in their elution, and the analysis period would be extremely long. Increasing the acetonitrile concentration as shown in FIG. 3 accelerates the elution of compounds which are slower to be eluted, and thereby shortens the analysis period, while maintaining the degree of separation of the compounds which are eluted at early stages.

Azo compounds which are slower to be eluted among the azo compounds contained in the 44 azo dyes shown in FIGS. 6 and 7 are comparatively difficult to be ionized in the ESI ion source 121 of the MS/MS unit 12. This means that the detection sensitivity for those compounds is low. Increasing the acetonitrile concentration has a favorable effect in this respect. That is to say, since acetonitrile has comparatively high viscosity, increasing the acetonitrile concentration helps the formation of micro droplets in the ESI ion source 121 of the MS/MS unit 12, which improves the ionization efficiency. This consequently enhances the detection sensitivity for the compounds which are slower to be eluted.

Meanwhile, the MS controller 24 specifies a detection time range for each compound by setting a predetermined width of time centered on the retention time specified for each compound in the selected analysis method. After the point of injection of the liquid sample, the MS controller 24 controls each relevant section in the MS/MS unit 12 within the detection time range assigned to each compound so as to perform MRM measurements corresponding to the MRM transitions of the quantifier ion and the reference ion specified for the compound concerned. The controller also changes the applied voltages to the relevant components according to the collision energy and other parameters specified for the MRM transition. As is commonly known, triple quadrupole mass spectrometers can perform MRM measurements for different MRM transitions within the same time range in an effectively concurrent form (or to be exact, by a time-division control). Therefore, no problem will arise if the detection time ranges for different compounds overlap each other, or if the MRM measurements for the multiple ions (i.e. quantifier ion and reference ions) must be performed within the same detection time range.

Figure 20:
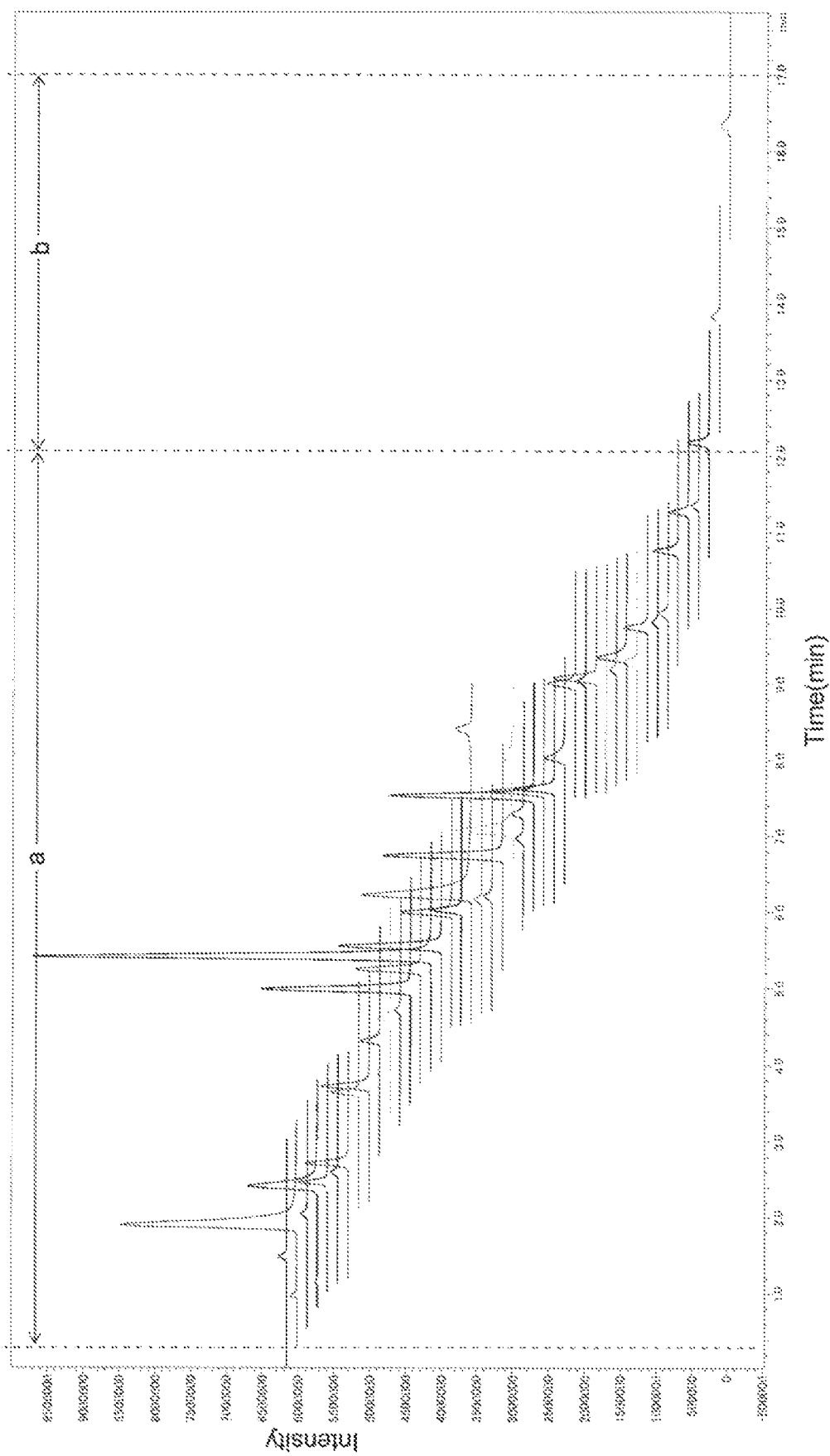
FIG. 20 is a measured example of an extracted ion chromatogram obtained by an analysis using the simultaneous analysis method for the first group of azo dyes.

FIG. 20 is a measured example of an extracted ion chromatogram obtained by an analysis using the simultaneous analysis method for the first group of azo dyes. Although FIG. 20 includes no description of which compounds correspond to the individual chromatogram curves, the correspondence between the chromatogram curves and the compounds can be evidently understood from the retention time of each compound shown in FIGS. 13 and 14.

The periods labeled "a" and "b" in FIG. 20 respectively correspond to the periods "a" and "b" in FIG. 3, where "a" is the period during which the mixture ratio of the mobile phase B linearly increases, while "b" is the period during which the mixture ratio of the mobile phase B is constantly maintained at 100%. This chromatogram evidently demonstrates that the 44 compounds were satisfactorily separated on an overall basis, with each compound observed with a sufficient intensity. Although some peaks originating from different compounds temporally overlap each other, they can be sufficiently separated from each other due to their difference in MRM transition. Therefore, the data processing unit 21 can calculate the area of the peak corresponding to the target substance on each chromatogram created in this manner, and determine a quantitative value (content value) from the peak area with reference to a calibration curve. Despite the fact that the number of azo compounds to be simultaneously analyzed is as large as 44, the analysis can be completed within 20 minutes.

In the case of exhaustively investigating major azo compounds whose uses are regulated, an analysis using the simultaneous analysis method for the second group of azo dyes is also performed in addition to the previously described analysis using the simultaneous analysis method for the first group of azo dyes. As noted earlier, the former analysis uses mobile phases which are different from those used in the analysis using the simultaneous analysis method for the first group of azo dyes.

When the operator has selected the simultaneous analysis method for the second group of azo dyes and issued the command to initiate the measurement, the LC controller 23 controls the mixer 113 in the LC unit 11 so that the mobile phases A and B will initially be mixed at a ratio of 98% to 2% and supplied to the column 116. This mixture ratio is maintained until the lapse of 0.50 minutes from the point in time where the liquid sample was injected through the injector 115 into the mobile phase (0.00 minute). While the lapse time is within a range from 0.50 minutes to 6.00 minutes, the mixer 113 is controlled so that the mixture ratio of mobile phase B linearly increases from 2% to 90%. This mixture ratio (mobile phase B:90%) is maintained while the lapse time is within a range from 6.00 minutes to 7.50 minutes. While the lapse time from the point of injection of the liquid sample is within a range from 7.50 minutes to 7.51 minutes, the mixer 113 is controlled so that the mixture ratio of mobile phase B linearly decreases from 90% to 2%. This mixture ratio (mobile phase B:2%) is maintained from 7.51 minutes on.

As noted earlier, the mixed mobile phase is constantly maintained around neutrality (from neutrality to weak alkalinity), since the mobile phase A contains ammonium bicarbonate as an additive while the mobile phase B is acetonitrile. As the mixture ratio of the mobile phase B linearly increases, the acetonitrile concentration in the mixed mobile phase also linearly increases. If the liquid sample contains one or more of the azo compounds corresponding to the seven azo dyes shown in FIG. 8, each azo compound will be separated from the other compounds according to its retention time, as the mixture ratio of the mobile phases A and B is varied with time in the previously described manner under the condition that the pH of the mixed mobile phase is maintained around neutrality.

If the acetonitrile concentration were not increased, compounds which are slower to be eluted would be significantly delayed in their elution, and the analysis period would be extremely long. Increasing the acetonitrile concentration as shown in FIG. 4 accelerates the elution of compounds which are slower to be eluted, and thereby shortens the analysis period, while maintaining the degree of separation of the compounds which are eluted at early stages. Azo compounds which are slower to be eluted among the azo compounds contained in the seven azo dyes shown in FIG. 8 are comparatively difficult to be ionized in the ESI ion source 121 of the MS/MS unit 12. This means that the detection sensitivity for those compounds is low. Increasing the acetonitrile concentration has a favorable effect in this respect. That is to say, since acetonitrile has comparatively high viscosity, increasing the acetonitrile concentration helps the formation of micro droplets in the ESI ion source 121 of the MS/MS unit 12, which improves the ionization efficiency. This consequently enhances the detection sensitivity for the compounds which are slower to be eluted.

Meanwhile, the MS controller 24 specifies a detection time range for each compound by setting a predetermined width of time centered on the retention time specified for each compound in the selected analysis method. After the point of injection of the liquid sample, the MS controller 24 controls each relevant section in the MS/MS unit 12 within the detection time range assigned to each compound so as to perform MRM measurements corresponding to the MRM transitions of the quantifier ion and the reference ion specified for the compound concerned. The controller also changes the applied voltages to the relevant components according to the collision energy and other parameters specified for the MRM transition. The analyses for the azo compounds contained in the three azo dyes named "Acid Red 26", "Direct Red 28" and "Direct Black 38" are each performed in both positive and negative ionization modes.

Figure 21:
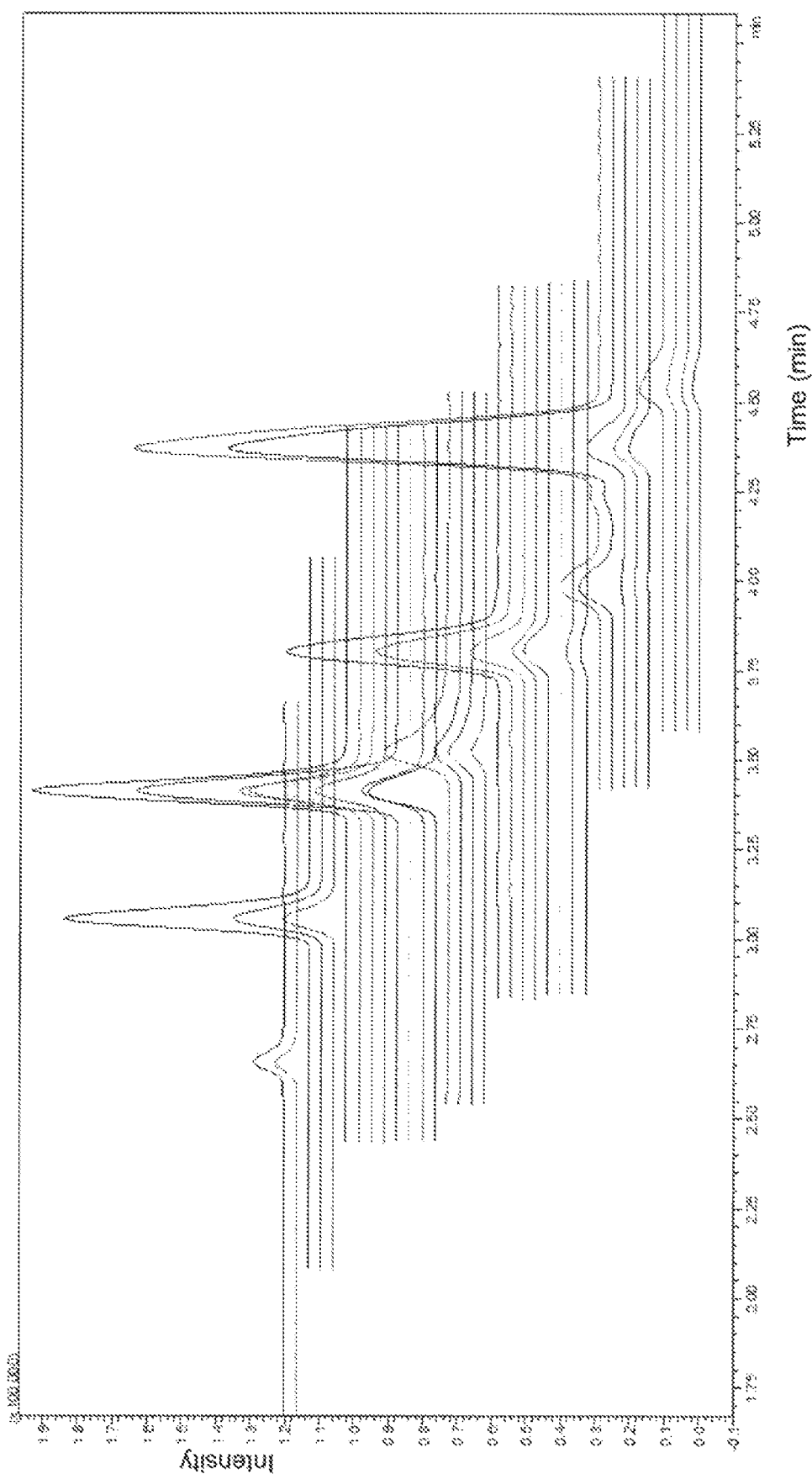
FIG. 21 is a measured example of an extracted ion chromatogram obtained by an analysis using the simultaneous analysis method for the second group of azo dyes.

FIG. 21 is a measured example of an extracted ion chromatogram obtained by an analysis using the simultaneous analysis method for the second group of azo dyes. In FIG. 21, analysis results obtained for a plurality of liquid samples containing the same compound at different concentrations are superposed on each other, so that a plurality of chromatogram curves with different peak intensities are drawn at the same retention time.

In the present case, the seven azo compounds are all detected within a period in which the mixture ratio of the mobile phase B is increasing. This chromatogram evidently demonstrates that the seven compounds were satisfactorily separated on an overall basis, with each compound observed with a sufficient intensity. Although some peaks originating from different compounds temporally overlap each other, they can be sufficiently separated from each other due to their difference in MRM transition. Therefore, the data processing unit 21 can calculate the area of the peak corresponding to the target substance on each chromatogram created in this manner, and determine a quantitative value (content value) from the peak area with reference to a calibration curve. The analysis for the seven compounds can be completed within 10 minutes.

As described thus far, in the analyzing method according to one embodiment of the present invention which is carried out using the analyzing system in the present example, the quantities of a large number of azo compounds which are representative hazardous substances can be exhaustively determined by performing the two previously determined analyses for the same sample, i.e. the analysis using the simultaneous analysis method for the first group of azo dyes and the analysis using the simultaneous analysis method for the second group of azo dyes. A test for the hazardous substances can thereby be efficiently performed.

In the previous embodiment, the quantitative analysis is performed for 44 azo compounds by the simultaneous analysis method for the first group of azo dyes and for seven azo compounds by the simultaneous analysis method for the second group of azo dyes. It is not always necessary to analyze all those azo compounds; one or more of those compounds may be excluded from the analysis. Conversely, different kinds of azo compounds and/or compounds other than azo compounds may additionally be subjected to the quantitative analysis along with the previously mentioned azo compounds.

The gradient programs described in the previous embodiment are mere examples. The mixture ratio of the mobile phases as well as the periods of time during which the mixture ratio is varied can be appropriately changed within the spirit of the present invention. The concentrations of the additives added to the mobile phases A and B to be mixed are also mere examples. The retention times of the compounds in the previous embodiment are also mere examples, since the retention time for a compound depends on not only the kind of mobile phase but also its flow velocity. In some cases, the quantifier ion and the reference ion specified for each compound may be transposed.

In the previous embodiment, the mass spectrometer is a triple quadrupole mass spectrometer, and MRM measurements are performed with the mass spectrometer. The mass spectrometer may be a Q-TOF mass spectrometer, ion trap mass spectrometer. IT-TOF mass spectrometer, or other appropriate types of mass spectrometers. As noted earlier, depending on the kind of azo compound to be analyzed, a SIM measurement may be performed using a common type of mass spectrometer in which no dissociation of ions is performed, such as a single-type quadrupole mass spectrometer.

It is evident that the previously described embodiment is a mere example of the present invention and can be appropriately changed or modified within the spirit of the present invention.

REFERENCE SIGNS LIST

10 . . . Measurement Section
11 . . . Liquid Chromatograph (LC) Unit
12 . . . Triple Quadrupole Mass Spectrometer (MS/MS) Unit
20 . . . Personal Computer
21 . . . Data Processing Unit
22 . . . Control Unit
23 . . . LC Controller
24 . . . MS Controller
25 . . . Analysis Condition Setter
26 . . . Method Storage Section
27 . . . Input Unit
28 . . . Display Unit
100 . . . Basic Analysis-Control Program
200 . . . Method Package for Hazardous Substances in Fiber Products
220 . . . Simultaneous Analysis Method for the First Group of Azo Dyes
230 . . . Simultaneous Analysis Method for the Second Group of Azo Dyes

The invention claimed is:

1. A method for analyzing a plurality of kinds of azo compounds in a sample, comprising:
a first analyzing step in which a first analysis is performed for a target sample to detect a plurality of azo compounds in the sample, using a liquid chromatograph in which a liquid chromatograph with a reverse phase column, the liquid chromatograph being coupled with a mass spectrometer; and
a second analyzing step in which a second analysis is performed for the target sample to detect a plurality of azo compounds which are contained in the sample, using a liquid chromatograph in which a liquid chromatograph with a reverse phase column, the liquid chromatograph being coupled with a mass spectrometer,
wherein:
the first analyzing step is a gradient analysis using, as two mobile phases, a first mobile phase which is either an aqueous ammonium acetate solution or an aqueous ammonium formate solution, and a second mobile phase which is a mixture of an organic solvent and either an aqueous ammonium acetate solution or an aqueous ammonium formate solution; the second analysis is a gradient analysis using, as two mobile phases, a first mobile phase which is an aqueous solution of ammonia or ammonium salt with pH greater than 7.0, and a second mobile phase which is an organic solvent; and the azo compounds to be detected in the second analysis are azo compounds each of which produces a primary aromatic amine hazardous to a human body through a reduction reaction, the azo compounds including include azo compounds contained in seven kinds of azo dyes which respectively have following color index substance names: Acid Red 26, Acid Red 114, Direct Red 28, Direct Blue 6, Direct Black 38, Direct Brown 95 and Navy Blue 1.

2. The analyzing method for azo compounds according to claim 1, further comprising a processing step for determining a quantitative value for each of the plurality of azo compounds in the sample, based on analysis results obtained by the first analyzing step and the second analyzing step.

3. The analyzing method for azo compounds according to claim 1, further comprising a sample preparation step in which a liquid sample as the aforementioned sample is prepared by extracting a substance from a fiber product in a solution.

4. The analyzing method for azo compounds according to claim 1, wherein the azo compounds to be detected in the first analysis are azo compounds each of which produces a primary aromatic amine hazardous to a human body through a reduction reaction, the azo compounds including azo compounds contained in 44 kinds of azo dyes which respectively have following color index substance names: Basic Red 9, Disperse Blue 1, Basic Violet 14, Disperse Blue 7, Disperse Blue 3, Disperse Red 11, Disperse Blue 102, Disperse Red 17, Disperse Yellow 39, Disperse Blue 106, Solvent Yellow 1, Disperse Orange 3, Disperse Yellow 3, Disperse Brown 1, Disperse Orange 11, Basic Green 4, Disperse Red 1, Disperse Blue 35, Disperse Yellow 49, Basic Violet 1, Solvent Yellow 3, Disperse Blue 124, Basic Violet 3, Solvent Yellow 2, Disperse Orange 37/76, Michler's Base, Disperse Blue 26, Disperse Orange 61, Disperse Yellow 56, Disperse Orange 1, Disperse Yellow 23, Basic Blue 26, Sudan Dye I, Disperse Red 151, Sudan Dye II, Sudan Dye III, Sudan Dye IV, Acid Orange 7, Acid Yellow 36, Acid Violet 49, Disperse Yellow 1, Disperse Yellow 9, Disperse Yellow 7 and Disperse Orange 149.

5. The analyzing method for azo compounds according to claim 1, wherein:
- the mass spectrometer is a tandem mass spectrometer capable of a multiple reaction monitoring (MRM) measurement; and
- a mass spectrometric analysis for an MRM transition specified for each azo compound is performed in the mass spectrometer in the first analysis and the second analysis.

* * * * *